United States Patent
Pathak et al.

(10) Patent No.: US 12,405,785 B1
(45) Date of Patent: Sep. 2, 2025

(54) PHASED DEPLOYMENT

(71) Applicant: DocuSign, Inc., San Francisco, CA (US)

(72) Inventors: Avanish Pathak, Rochester, NY (US); Mark Peterson, Bellevue, WA (US); Bhargav Krishna, Snohomish, WA (US); Vikas Singh, San Jose, CA (US)

(73) Assignee: Docusign, Inc., San Francisco, CA (US)

( * ) Notice: Subject to any disclaimer, the term of this patent is extended or adjusted under 35 U.S.C. 154(b) by 165 days.

(21) Appl. No.: 18/362,762

(22) Filed: Jul. 31, 2023

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 8,676,943 | B1 * | 3/2014 | Parthasarathy | G06F 9/5061 709/221 |
| 9,158,577 | B2 * | 10/2015 | Lipscomb | G06F 8/656 |
| 10,019,255 | B1 * | 7/2018 | Greenfield | G06F 11/1433 |
| 11,269,616 | B1 * | 3/2022 | Schumaker | G06F 8/65 |
| 2014/0013315 | A1 * | 1/2014 | Genevski | G06F 8/60 717/170 |
| 2014/0379901 | A1 * | 12/2014 | Tseitlin | H04L 41/5025 709/224 |
| 2021/0234887 | A1 * | 7/2021 | Landman | H04L 63/1433 |
| 2022/0156053 | A1 * | 5/2022 | Shaastry | G06F 8/433 |

FOREIGN PATENT DOCUMENTS

| | | | | |
|---|---|---|---|---|
| CN | 114625410 A | * | 6/2022 | |
| WO | WO-2023143237 A1 | * | 8/2023 | G06F 21/12 |

OTHER PUBLICATIONS

U.S. Appl. No. 18/345,799, filed Jun. 30, 2023, naming inventors Pathak et al.
U.S. Appl. No. 18/345,815, filed Jun. 30, 2023, naming inventors Pathak et al.
Zakas, "Scalable JavaScript Application Architecture", Sep. 7, 2009, 108 pp., URL: https://ffconf.org/talks/scalable-javascript-application-architecture/.

* cited by examiner

*Primary Examiner* — Philip Wang
(74) *Attorney, Agent, or Firm* — Shumaker & Sieffert, P.A.

(57) ABSTRACT

Techniques are described for deploying software applications associated with document management. The techniques may include a system comprising processing circuitry implemented by one or more processors, the processing circuitry having access to a memory. The processing circuitry may be configured to determine, for a time window, a current version of a widget and a next version of the widget to implement a software application of the one or more software applications. The processing circuitry may further be configured to output instructions to execute the current version of the widget in response to receiving a first request for the software application. The processing circuitry may further be configured to output instructions to execute the next version of the widget based on a number of responses to previous requests that select the current version of the widget.

20 Claims, 12 Drawing Sheets

DEPLOYMENT CONFIGURATION
650

ENVIRONMENT
652

● DEMO

○ PRODUCTION

WIDGET VERSION INFORMATION
654

WIDGET ROUTE: Domain.net/pdfViewer    VERSION: 1.2.3

METRIC THRESHOLDS
656

| CHANGE PERFORMANCE VARIABLES | CHANGE ALLOWABLE NUMBER OF ERRORS OR WARNINGS |
|---|---|
| CHANGE APPLICATION LAUNCH TIME THRESHOLD | CHANGE WIDGET LOAD TIME THRESHOLD |

TIME WINDOW
658

START TIME: (UNIX TIMESTAMP)    END TIME: (UNIX TIMESTAMP)
1682348458    1682352058

FIG. 9

PHASED DEPLOYMENT

TECHNICAL FIELD

This disclosure relates generally to management of a software application.

BACKGROUND

Continuous integration and continuous deployment (CI/CD) environments implemented by software development teams typically include utilities for software developers to upload and deploy a software application. Current CI/CD environments generally involve software applications developed by various teams. CI/CD environments generally require a server hosting the software application to restart every time a new version of the software application is deployed.

SUMMARY

Aspects of the present disclosure describe techniques for deploying a software application associated with document management. Software applications associated with document management may include user experiences related to managing electronic or digital documents (e.g., generate a document, sign a document, etc.). Software developers may create, update, integrate, deploy, or otherwise develop software applications via a continuous integration and continuous deployment ("CI/CD") environment. Software applications are deployed when the CI/CD environment allows client devices to request and access files and data included in the software applications. Using the CI/CD environments may help to implement a common knowledge base that may help to ensure compatibility of all software components (e.g., widgets and/or plugins) used in software application development and runtime deployment. In this way, the techniques allow new versions of code developed by software developers to be seamlessly deployed with previously deployed code at runtime.

The techniques described herein help to provide software developers flexibility when deploying new versions of a component of a software application (e.g., a new version of a widget). For example, a single server or a computing system may implement a phased deployment, where the system responds to each request for a software application such that the responses to the requests specify a target ratio of a new version and currently deployed version of a widget. The system may, for example, progressively increase the target ratio based on a time window defined by software developers of a new version of a widget. The system may progressively increase the target ratio until all client devices receive instructions to execute a new version of the widget at the close of the time window. In this way, the system may efficiently manage versions of widgets executing on client devices without additional computational and/or network resources such as load balancers. The system may monitor execution of a new version of a widget throughout the time window to take a particular action (e.g., roll-back deployment of the new version of the widget, increase target ratio at a faster rate, etc.) or make a suggestion (e.g., issue an alert to a software developer device indicating one or more performance criteria have not been met) based on a relationship of monitored metrics and configurable criteria.

In one example, the present disclosure describes a system for deploying a software application associated with document management. The system may comprise processing circuitry implemented by one or more processors, the processing circuitry having access to a memory. The processing circuitry may be configured to determine, for a time window, a current version of a widget and a next version of the widget to implement a software application of the one or more software applications, wherein a repository is configured to provide the current version of the widget in response to a first call for the current version of the widget and provide the next version of the widget in response to a second call for the next version of the widget. The processing circuitry may further be configured to output instructions to execute the current version of the widget in response to receiving a first request for the software application. The processing circuitry may further be configured to output instructions to execute the next version of the widget based on a number of responses to previous requests that select the current version of the widget, the previous requests including the first request in response to receiving a second request for the software application after the first request.

In another example, the present disclosure describes a method for deploying a software application associated with document management. The method may include determining, by a computing system and for a time window, a current version of a widget and a next version of the widget to implement a software application of the one or more software applications, wherein a repository is configured to provide the current version of the widget in response to a first call for the current version of the widget and provide the next version of the widget in response to a second call for the next version of the widget. The method may further include in response to receiving a first request for the software application, outputting, by the computing system, instructions to execute the current version of the widget. The method may further include in response to receiving a second request for the software application after the first request, outputting, by the computing system, instructions to execute the next version of the widget based on a number of responses to previous requests that select the current version of the widget, the previous requests including the first request.

In another example, the present disclosure describes a computer-readable storage medium comprising instructions that, when executed, configure processing circuitry of a computing system to determine, for a time window, a current version of a widget and a next version of the widget to implement a software application of the one or more software applications, wherein a repository is configured to provide the current version of the widget in response to a first call for the current version of the widget and provide the next version of the widget in response to a second call for the next version of the widget. The processing circuitry may further be configured to output instructions to execute the current version of the widget in response to receiving a first request for the software application. The processing circuitry may further be configured to output instructions to execute the next version of the widget based on a number of responses to previous requests that select the current version of the widget, the previous requests including the first request in response to receiving a second request for the software application after the first request.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

FIG. 9 is a conceptual diagram illustrating an example deployment configuration for a new version of a widget, in accordance with techniques of this disclosure.

Like reference characters denote like elements throughout the text and figures.

DETAILED DESCRIPTION

Figure 1:
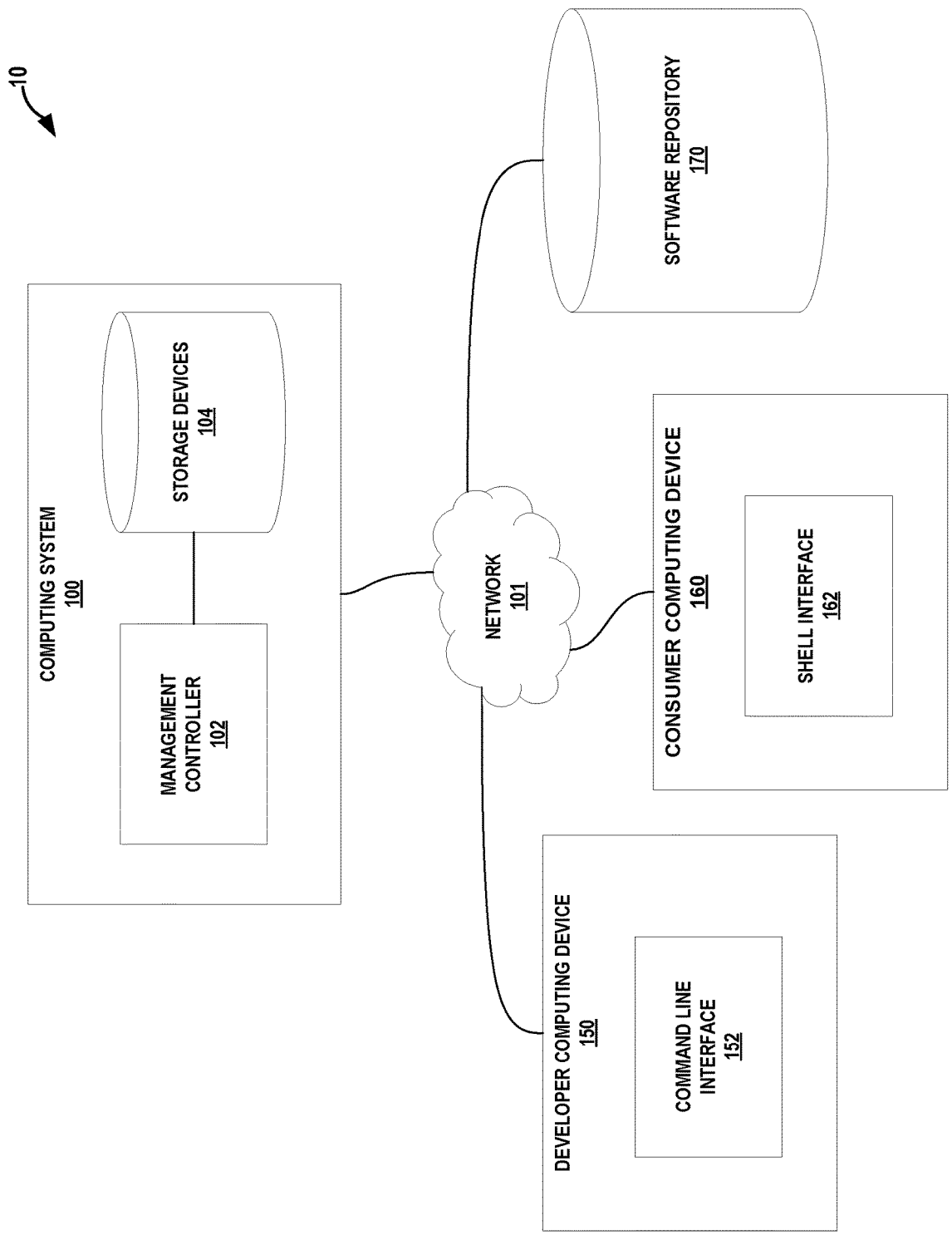
FIG. 1 is a block diagrams illustrating an example computing environment for managing deployment of software applications, in accordance with techniques of this disclosure.

In general, aspects of the present disclosure describe techniques for deploying a software application associated with document management. Software applications associated with document management may include user experiences related to managing electronic or digital documents (e.g., generate an electronic document, sign an electronic document, etc.). Software applications may be deployed with multiple widgets. A widget may be a collection of software code used by the software application to provide the user experience (e.g., create a new Portable Document Format (PDF) file, open a PDF file, etc.). For example, a widget may include a snippet of JavaScript® logic that runs in a web browser. Software developers may create, update, integrate, deploy, or otherwise develop widgets for software applications via a continuous integration and continuous deployment ("CI/CD") environment.

Software developers may use the CI/CD environment to deploy a new version of a software application or a software application component (e.g., widget) by instructing consumer devices to load code files associated with the new versions of the software application or software application component. Some CI/CD environments may redirect consumer-related software application requests (e.g., network-based requests made for the software application) by rebooting a server hosting the software application to include the new version of the software application. Some CI/CD environments may reduce or eliminate rebooting a server of a CI/CD computing system (e.g., a cloud-based server and/or content delivery network) by, for example, implementing a load balancer to redirect software application requests to another server hosting the new version of the software application. For example, a CI/CD computing system may include a load balancer developed to redirect consumer traffic from a server of the CI/CD computing system hosting a current version of a widget to a different server of the CI/CD computing system hosting a new version of a widget.

The techniques described herein may include a CI/CD computing system that may dynamically deploy new versions of a software application component (e.g., widget) during runtime or execution of software applications implementing the software application component. The CI/CD computing system may dynamically deploy new versions of widgets without restarting a server hosting the software application component and without using a load balancer. In some instances, the CI/CD computing system may specify, based on a target ratio and a time window, either the new version of the widget or the current version of the widget in responses to requests for software applications implementing the widget. The CI/CD computing system may dynamically deploy a new version of a widget by progressively sending instructions to requesting client devices to execute the new version of the widget. For example, the CI/CD computing system may send instructions to execute a new version of a widget by specifying an identifier or address (e.g., uniform resource indicator) associated with the new version of the widget in a configuration file included in the instructions to execute a requested software application implementing the widget. The CI/CD computing system may send instructions to execute the new version of the widget based on a target ratio associated with a particular phase of the time window and in response to metrics associated with execution of the new version of the widget satisfying criteria. In this way, the CI/CD computing system may manage deployment of new versions of software application components without implementing load balancers. The techniques described herein may avoid a CI/CD computing system statically implementing load balancers for deployment of new versions of widgets during build time (e.g., steps associated with preparing software application code for demonstration or production). The CI/CD computing system supports implementation of a singular server to support any number of versions instead of relying on a unique server instance for each version.

The techniques described herein may provide one or more technical advantages that realize one or more practical applications. For example, a computing system may operate as a common knowledge base to dynamically deploy new versions of a software application or software application component (e.g., widget). The computing system may dynamically deploy new versions of software application components by progressively sending configuration information associated with the new versions of the software application components during a time window. In some instances, the computing system may determine a total number of requests for the widget during a particular time within a time window. The computing system may determine a number of requests selected as recipients of a new version of the widget based on a target ratio associated with the particular time within the time window. For example, the computing system may determine a total number of requests for a widget is 100 during a middle phase of the time window. The computing system may configure the middle phase of the time window to define a target ratio of 0.5. The computing system may determine that during the middle phase of the time window, 50 requests for the widget receive instructions to execute the current version of the widget and the other 50 requests for the widget receive instructions to execute the new version of the widget. In some examples, the computing system may implement a machine learning model to determine the target ratio based on obtained metrics associated with execution performance of the new version of the widget.

The computing system may receive an input from software developers specifying a time window that defines a period in time consumer devices should execute a new version of a software application component. In some instances, the computing system may receive an input of a time window specifying a start date and/or time and an end date and/or time. In some examples, the computing system may partition the time window into phases and assign a target ratio to each phase. For example, the computing system may receive an input specifying that a new version of a widget will begin deployment at 5:00 pm and end at 6:00 pm on the same day. The computing system may partition the one-hour time window into four equally spaced phases and assign a target ratio of responses including the new version of the application divided by a total number of requests for the widget. The computing system, for example, may assign a target ratio of zero (no instructions to execute the new version of the widget) before the time specified in the time window begins. The computing system may assign a target ratio of 0.25 to the first phase (25% of requests for the widget receive instructions to execute the new version of the widget), 0.5 for the second phase (50% of requests for the widget receive instructions to execute the new version of the widget), 0.75 for the third phase (75% of requests for the widget receive instructions to execute the new version of the widget), and 1 for the final phase (100% of requests for the widget receive instructions to execute the new version of the widget).

The computing system may respond to consumer requests for a software application component with configuration information associated with the new version of the software application component and instructions to execute the new version of the software application component. The consumer device requesting the software application component may not experience interruptions when requesting the software application component when the new version of the software application component is deployed because the computing system sends instructions to execute the new version of the software application based on configuration information associated with the new version of the software application. The computing system may reduce a processing burden associated with a server or software repository hosting software application components. For example, a software repository hosting widgets is not necessarily required to track versions of widgets because the computing system may dynamically manage versions of widgets with one or more configuration files. The software repository may not necessarily be required to restart when deploying the new version of the software application component when the software repository does not use computational resources in the management and deployment of widgets. The computing system may further reduce computational resources by managing progressive deployment of new versions of widgets without any load balancer to redirect consumer traffic to a new version of the widget. The computing system may be implemented as a single server that can individually manage deployment of new versions of widgets without implementing a load balancer to redirect traffic to an additional server. The computing system may efficiently manage deployment of a new version of a widget with configuration information and instructions sent in a response to a request for a software application that implements the widget. The computing system may reduce processing resources associated with managing software application deployment by, for example, redirecting consumer traffic to a new version of the software application component during runtime (e.g., while a software application is being executed by a consumer device).

The computing system may help to provide software developers flexibility in managing deployment of a new version of a software application component without having to implement any load balancing techniques during build time. Software developers may build a new version of a widget, locally test the new version of the widget, integrate the new version of the widget in software applications, and stage the new version of the widget by executing quality assurance and/or security tests on the new version of the widget. The computing system may provide software developers an option to phase deployment of a new version of a widget during a demonstration or production stage associated with the lifecycle of the new version of the widget. The computing system may enable software developers to deploy the new version of the widget to a subset of client devices. The computing system may monitor runtime performance metrics associated with the new version of the widget executing on the subset of client devices. In this way, the computing system may minimize risk of unknown or undetected errors caused by the new version of the widget because the computing system has only instructed a subset of client devices to execute the new version of the application. The computing system may determine whether the new version of the widget results in an enhancement over a current or previous version of the widget based on the obtained metrics. In this way, the computing system provides software developers the ability to monitor execution of a new version of a widget only on a subset of client devices to make determinations on whether to roll-back or speed up deployment of the new version of the widget.

FIG. 1 is block diagram illustrating an example computing environment 10 for managing deployment of software applications, in accordance with techniques of the disclosure. In the example of FIG. 1, computing environment 10 includes computing system 100, developer computing device 150, consumer computing device 160, and software repository 170. Computing environment 10 may represent a CI/CD environment for developers to write and release software applications. Computing environment 10 may include a starter kit, utilities, standard development kits, application programming interfaces, or other developer resources. Computing system 100 may manage the developer resources to help developers upload code to a repository that is compatible with other code in the repository. In some examples, computing system 100 may represent a cloud computing system that provides one or more services via network 101. Computing system 100 may include a collection of hardware devices, software components, and/or data stores that can be used to implement one or more applications or services provided to developer computing device 150 and consumer computing device 160 via network 101. Computing system 100 may represent a cloud-based implementation. As used herein, client device may refer to developer computing device 150, consumer computing device 160, or a device that performs the function of both developer computing device 150 and consumer computing device 160.

Network 101 may include the Internet or may include or represent any public or private communications network or other network. For instance, networks 101 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 101 using any suitable communication techniques. Network 101 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 101 using one or more network links. The links coupling such devices or systems to network 101 may be Ethernet, Asynchronous Transfer Mode (ATM) or other types of network connections, and such connections may be wireless and/or wired connections. One or more of the devices or systems illustrated in FIG. 1 or otherwise on network 101 may be in a remote location relative to one or more other illustrated devices or systems.

Computing system 100, developer computing device 150, consumer computing device 160, and software repository 170 may send and receive data via network 101. Data exchanged over the network 101 may be represented using any suitable format, such as hypertext markup language (HTML), extensible markup language (XML), or JavaScript Object Notation (JSON). In some aspects, network 101 may include encryption capabilities to ensure the security of documents. For example, encryption technologies may include secure sockets layers (SSL), transport layer security (TLS), virtual private networks (VPNs), and Internet Protocol security (IPsec), among others.

Examples of developer computing device 150 and consumer computing device 160 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. Developer computing device 150 and consumer computing device 160 may be examples of client devices that may interact with computing system 100 to upload, use, or otherwise access software applications managed by computing system 100.

Developer computing device 150 may include command line interface 152. Developer computing device 150 may be operated by a software developer who may upload and access code for a software application based on configuration information received from computing system 100. Command line interface 152 may provide an interactive environment for developers to develop and deploy software applications. Command line interface 152 may include, but is not limited to, a shell terminal or application programming interface managed by computing system 100. As used herein, a shell terminal may refer to a software program that acts as command-line interpreter for services related to an application provided by computing system 100. For example, command line interface 152 may process commands (e.g., user inputs) received by developer computing device 150 to generate instructions and output, via network 101, the instructions to computing system 100 and/or to software repository 170. For instance, developer computing device 150 may use command line interface 152 to upload software code to software repository 170.

Developer computing device 150 may pull software applications and resources associated with the software applications from software repository 170. Software repository 170 may include, but is not limited to, a content delivery network, cloud storage systems, or any collection of databases used to store and send software files. For example, software repository 170 may be a content delivery network that implements Microsoft Solutions Framework®.

Consumer computing device 160 may include shell interface 162. Consumer computing device 160 may be a computing device operated by a consumer of software applications managed by computing system 100. Shell interface 162 may include, but is not limited to, a web browser or user interface that may request data from computing system 100 and software repository 170 via network 101. Consumer computing device 160 may request access to a software application with shell interface 162 (e.g., a browser shell interface or application interface). For example, consumer computing device 160 may request the software application to manage electronic documents with shell interface 162. In some systems, CI/CD environments may require a server hosting the software application to restart when deploying a new version of the software application. This may result in interruptions of a user's experience using the software application. The techniques described herein may apply a common knowledge base (e.g., computing system 100) to regulate network traffic to new versions of software applications. In this way, the techniques help to reduce or eliminate restarting a host of a software application when a new version of the software application is deployed. The techniques described herein may help to improve an availability of software repository 170, which may potentially improve a user's experience using the software applications. The techniques described herein may send consumer computing device 160 instructions to execute a new version of a software application without interrupting the experience of a user operating consumer computing device 160 while executing the new version of the software application.

In the example of FIG. 1, computing system 100 may include one or more servers locally managed by a software administrator or a distributed or cloud-based computing system managed by the software administrator. Computing system 100 may include one or more computing devices, servers, databases, etc. communicably coupled to perform the techniques described herein. Computing system 100 may include management controller 102 and storage devices 104. Management controller 102 may be a module with instructions to manage new and updated software applications. For example, management controller 102 may be configured to upload and/or update configuration files associated with widget configuration information used to implement a software application. Management controller 102 may store new and/or updated configuration files associated with widget configuration information in storage devices 104. Storage devices 104 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support computing system 100. Functionality of management controller 102 and storage devices 104, as described herein, may be distributed across multiple computing devices within the distributed or cloud-based environment of computing system 100.

In accordance with the techniques of the disclosure, computing system 100 may dynamically redirect consumer requests for a software application to include a new version of a widget. Management controller 102 of computing system 100 may generate a response to a request from consumer computing device 160 for a software application. Management controller 102 may generate a response that includes instructions to execute the software application based on configuration information indicating a new version of a widget used in the execution of the software application. In some instances, management controller 102 may progressively include configuration information associated with the new version of the widget in the instructions to execute the software application based on a configurable time window. For example, consumer computing device 160 may execute a software application with a previous version of the widget until computing system 100 selects consumer computing device 160 as a recipient of configuration information associated with the new version of the widget. Computing system 100 may apply a machine learning model, or make inferences, to identify runtime characteristics of software applications executing with the new version of the widget. In some instances, computing system 100 may automatically roll back deployment of the new version of the widget or alert a team of software developers in response to the identified runtime characteristics not satisfying performance, security, or other quality assurance requirements. In this way, computing system 100 may monitor runtime characteristics of the new version of the widget executing on other consumer computing devices prior to instructing consumer computing device 160 to execute the new version of the widget.

In operation, computing system 100 may monitor software repository 170 for new versions of widgets used in the execution of software applications. Developer computing device 150 may use command line interface 152 to upload a new version of a widget to software repository 170. For instance, a user may provide, using command line interface 152, code for a new widget, perform testing and validation of the code, and, upon confirming that the code has satisfied the testing and validation, upload the code for storage by software repository 170 with an indication of the widget and a version for the code. In some instances, command line interface 152 may upload a build artifact of the new version of the widget to software repository 170. Command line interface 152 may upload the new version of the widget in a standardized format as a build artifact to ensure the new version of the widget is compatible with all other widgets managed by computing system 100.

In some instances, computing system 100 may generate a configuration file for the new version of the widget that includes configuration information associated with the new version of the widget. In some examples, computing system 100 may generate a deployment configuration file corresponding to an environment associated with the current integration and deployment lifecycle of the new version of the widget. For example, computing system 100 may generate a deployment configuration file for a production environment. A production environment may represent a stage in a widget lifecycle associated with the widget being executed on consumer computing device 160. Computing system 100 may only generate a deployment configuration file for the new version of the widget to be implemented in the production environment in response to the new version of the widget satisfying quality assurance and/or security requirements. In some instances, computing system 100 may include a preliminary threshold associated with the compatibility of the new version of the widget with the ecosystem supported by computing system 100.

In some instances, computing system 100 may determine (e.g., by periodically polling or based on an event) a current version of a widget and a next version of the widget to implement a software application. Computing system 100 may determine the current version of the widget and the next version of the widget for a time window. Computing system 100 may determine the current version of the widget and the next version of the widget for a time window that has been defined by developer computing device 150 when uploading the next version of the widget to software repository 170.

Software repository 170 may be configured to provide either the current version of the widget or the next version of the widget according to application programming interface (API) calls made based on either configuration files associated with the current version of the widget or configuration files associated with the next version of the widget. Computing system 100 may instruct a computing device requesting a software application that implements the widget (e.g., consumer computing device 160) to make an API call for the current version of the widget based on configuration information associated with the current version of the widget. Computing system 100 may instruct consumer computing device 160 to make an API call for the next version of the widget based on configuration information associated with the next version of the widget. Computing system 100 may instruct consumer computing device 160 to make an API call for the next version of the widget based on a number of previous requests for the widget made at a particular point in the time window defined by developer computing device 150. For instance, computing system 100 may instruct consumer computing device 160 to make a call for the next version based on a target ratio. Computing system 100 may progressively increase a target ratio throughout the time window. Computing system 100 may determine a target ratio representing a maximum percentage of requests for the widget that will receive instructions to execute the new version of the widget. For example, computing system 100 may have a target ratio of 0.0 at the beginning of the time window, such that no requests for the widget receive instructions to execute the new version of the widget. In some examples, computing system 100 may increase the target ratio proportional to the length of time defined in the time window. For example, computing system 100 may increase the target ratio by 0.01 every minute for a time window defining a 100-minute length of time.

In some instances, computing system 100 may instruct consumer computing device 160 to make a call for a next version of a widget. Computing system 100 may determine a target ratio for a particular amount of time in the time window. Computing system 100 may determine a target ratio that may include a maximum number of intended recipients of the new version of the widget divided by the total number of requests for the widget. For example, computing system 100 may determine a target ratio of 0.5 at a middle point in the time window. In this example, computing system 100 may determine that the total number of requests for the widget is 101 requests for the widget.

Computing system 100 may select 50 out of the 101 requests for the widget as recipients of the new version of the widget as to not exceed the target ratio of 0.5. Conversely, computing system 100 may determine a target ratio with respect to a minimum number of recipients of a current version of the widget. In the example of computing system 100 determining there are 101 requests for the widget, computing system 100 may apply a target ratio of 0.5 representing a minimum number of requests that may receive instructions to call and execute the current version of the widget. Computing system 100 may select 51 out of the 101 requests for the widget a recipient of the current version of the widget as to not go below the target ratio of 0.5. In this way, computing system 100 may actively monitor performance of the execution of the new version of the widget to avoid potential issues affecting a majority of requesting computing devices.

Management controller 102 of computing system 100 may receive a request from consumer computing device 160 to access a software application that may use the new version of the widget. Shell interface 162 may output the request for the software application via network 101. Management controller 102 may receive the request and generate a response. Management controller 102 may generate a response that includes instructions to execute the software application based on configuration information associated with widgets used in the implementation of the software application. For example, management controller 102 may receive a request to provide a plugin from consumer computing device 160. In this example, management controller 102 may determine one or more of widgets that provide the plugin. For instance, management controller 102 may determine a plugin and one or more widgets that the configuration information specifies as providing functionality (e.g., a PDF reader, authentication, etc.) for the plugin. In this example, management controller 102 may generate the response to include instructions to execute each of the one or more widgets identified in the configuration information as providing functionality for the plugin. Management controller 102 may send the response to shell interface 162 via network 101. Shell interface 162 may receive the response and request software code files from software repository 170 based on the instructions included in the response.

Computing system 100 may output instructions to execute the current version of a widget of a software application in response to shell interface 162 requesting the software application. Computing system 100 may output the instructions to execute the current version of the widget based a number of requests for software applications that include the current widget. Computing system 100 may output instructions to execute the current version of the widget based on the time window defined when developer computing device 150 uploaded the new version of the widget to software repository 170. For example, developer computing device 150 may upload a new version of a widget and define a time window of one hour to start immediately. At the time computing system 100 generates a deployment configuration file with configuration information associated with the new version of the widget, computing system 100 may send instructions to consumer computing device 160 to execute the current version of the widget. In some examples, computing system 100 may divide the time window into discrete phases, such as, for example, four phases of fifteen-minutes for a one-hour time window. Computing system 100 may assign a target ratio to each phase representing the number of recipients to be selected to receive the new version of the widget, divided by the total number of requests for the widget. Computing system 100 may refresh the total number of requests for the widget continuously (e.g., every three seconds). During the first phase (e.g., the first fifteen minutes of the time window), computing system 100 may assign a target ratio of 0.25. Computing system 100 may select 25% of the total requests for the widget as recipients of instructions to execute the new version of the widget. For example, computing system 100 may receive one-hundred requests for the widget. During the first phase, computing system 100 may respond to 25 (out of the 100) requests for the widget with instructions and configuration information associated with the new version of the widget and send a response to the other 75 requests with instructions to load a current or previous version of the widget. During the second phase (e.g., the second interval of fifteen minutes of the time window), computing system 100 may determine the number of requests for software applications that include the widget and allocate 50% of those requests as recipients of instructions to execute the new version of the widget. During the third phase (e.g., the third interval of fifteen minutes of the time window), computing system 100 may determine the number of requests for software applications that include the widget and allocate 75% of those requests as recipients of instructions to execute the new version of the widget. During the final phase (e.g., the last fifteen minutes of the time window), computing system 100 may determine the number of requests for software applications that include the widget and allocate 100% of those requests as recipients of instructions to execute the new version of the widget.

In some examples, computing system 100 may divide the time window into phases on the order of seconds. For example, computing system 100 may divide a time window into phases representing one-second. In this example, computing system 100 may increase the number of requests as recipients of instructions to execute the new version of the widget every second. Computing system 100 may increase the number of requests as recipients of instructions to execute the new version of the widget according to a target ratio. Computing system 100 may progressively increase the target ratio in each phase computing system 100 divided the time window into. For example, computing system 100 may divide a time window of 100 seconds into 100 phases representing one-second each. Computing system 100 may increase the target ratio by 0.01 in each phase of the time window. Computing system 100 may select the recipients of instructions to execute the new version of the widget by determining a total number of requests in each phase. In response to computing system 100 determining the total number of requests in a particular phase, computing system 100 may select a number of the requests as recipients of instructions to execute the new version of the widget in such a way as to not exceed the target ratio associated with the particular phase. For example, during the $75^{th}$ phase out of 100 phases with a target ratio of 0.75, computing system may determine a total number of requests for the widget is 14. Computing system 100 may select ten out of the 14 requests as recipients of instructions to execute the new version of the widget. In this way, computing system 100 may minimize any potential issues associated with the execution of the new version of the widget on computing devices.

In some instances, computing system 100 may select consumer computing device 160 as a recipient of configuration information associated with a new version of a widget. For example, consumer computing device 160 may be selected as a recipient of instructions to execute the new version of a widget during the final phase of a time window defined when the new version of the widget was uploaded to software repository 170. In some instances, consumer computing device 160 may not receive instructions to execute the new version of the widget if computing system 100 triggers an automatic roll back of the new version of the widget. For example, computing system 100 may receive metrics from other consumer computing devices executing the new version of the widget during the demonstration and/or production stage of the new version of the widget's lifecycle. Although developer computing device 150 may conduct pre-deployment validation prior to the demonstration or production stage of the new version of the widget, computing system 100 may monitor execution of the new version of the widget on consumer computing device 160 to determine whether quality assurance and/or security requirements are far below a threshold value. In some examples, computing system 100 may determine performance, quality assurance, security, etc. requirements of a new version are not met and take an action to either roll-back or alert a developer of developer computing device 150 that an issue is detected in the deployment of the new version of the widget.

Computing system 100 may obtain metrics associated with execution of the new version of the widget on consumer computing device 160. Examples of metrics may include, for example, a number of gate failures, uncaught bugs, API issues, critical security issues, or a particular combination of widget performing poorly. In response to determining that metrics received from computing devices executing the new version of the widget do not satisfy one or more criteria associated with quality assurance and/or security standards, computing system 100 may instruct all computing devices to execute the current version of the widget and stop instructing more computing devices to execute the new version of the widget (e.g., roll-back deployment of the new version of the widget). For example, computing system 100 may roll-back deployment of a new version of a widget as a result of gate failures or software bugs that may be unpredictable and was not encountered during internal testing (e.g., pre-deployment testing, quality assurance testing, security testing, SOC 2 compliance, etc.). In some examples, metrics may include a central processing unit (CPU) performance, memory performance, a graphical processor unit (GPU) performance, battery performance, application launch time, widget load time, number of errors or warnings during runtime execution of the new version of the widget, etc. For example, computing system 100 may receive metrics indicating that a CPU performance (e.g., clock cycles, threads per second, etc.) of consumer computing device 160 when executing the new version of the widget is less than a threshold value and/or has reduced a threshold amount from the current or previous version of the widget. In another example, computing system 100 may receive metrics indicating that a GPU performance (e.g., video processing, memory usage, etc.) of consumer computing device 160 does not satisfy a configurable performance criterion. Computing system 100 may receive metrics indicating that execution of the new version of the widget on consumer computing device 160 results in the performance of a battery of consumer computing device 160 not satisfying criterion. Computing system 100 may receive metrics indicating that the launch time of applications implementing the new version of the widget does not satisfy criterion. Computing system 100 may receive metrics indicating consumer computing device 160 loads the new version of the widget at a rate that does not satisfy criterion. Computing system 100 may receive metrics indicating a number of error or warnings issued by either software repository 170 or consumer computing device 160 when fetching, calling, accessing, executing, etc. the new version of the widget.

In response to determining that some obtained metrics do not satisfy performance criteria, computing system 100 may issue an alert or warning to developer computing device 150 indicating which performance metric is not satisfying pre-established criteria. In some instances, computing system 100 may categorize performance metrics to take a corresponding action based on the classification of a particular metric. For example, computing system 100 may categorize an obtained metric of an application load time of 5 seconds as an error that may result in an automatic roll-back of the new version of the widget. In another example, computing system 100 may identify an obtained metric of an application load time of 2 seconds as a warning and send an alert to developer computing device 150 without automatically rolling back deployment of the new version of the widget. In some examples, computing system 100 may implement any form of machine learning to intelligently determine whether obtained metrics should result in an automatic roll-back of the new version of the widget. Computing system 100 may train a machine learning model to automatically roll-back deployment of a new version of a widget according to obtained metrics and corresponding actions associated with deployment of many widgets managed by computing system 100.

Figure 2:
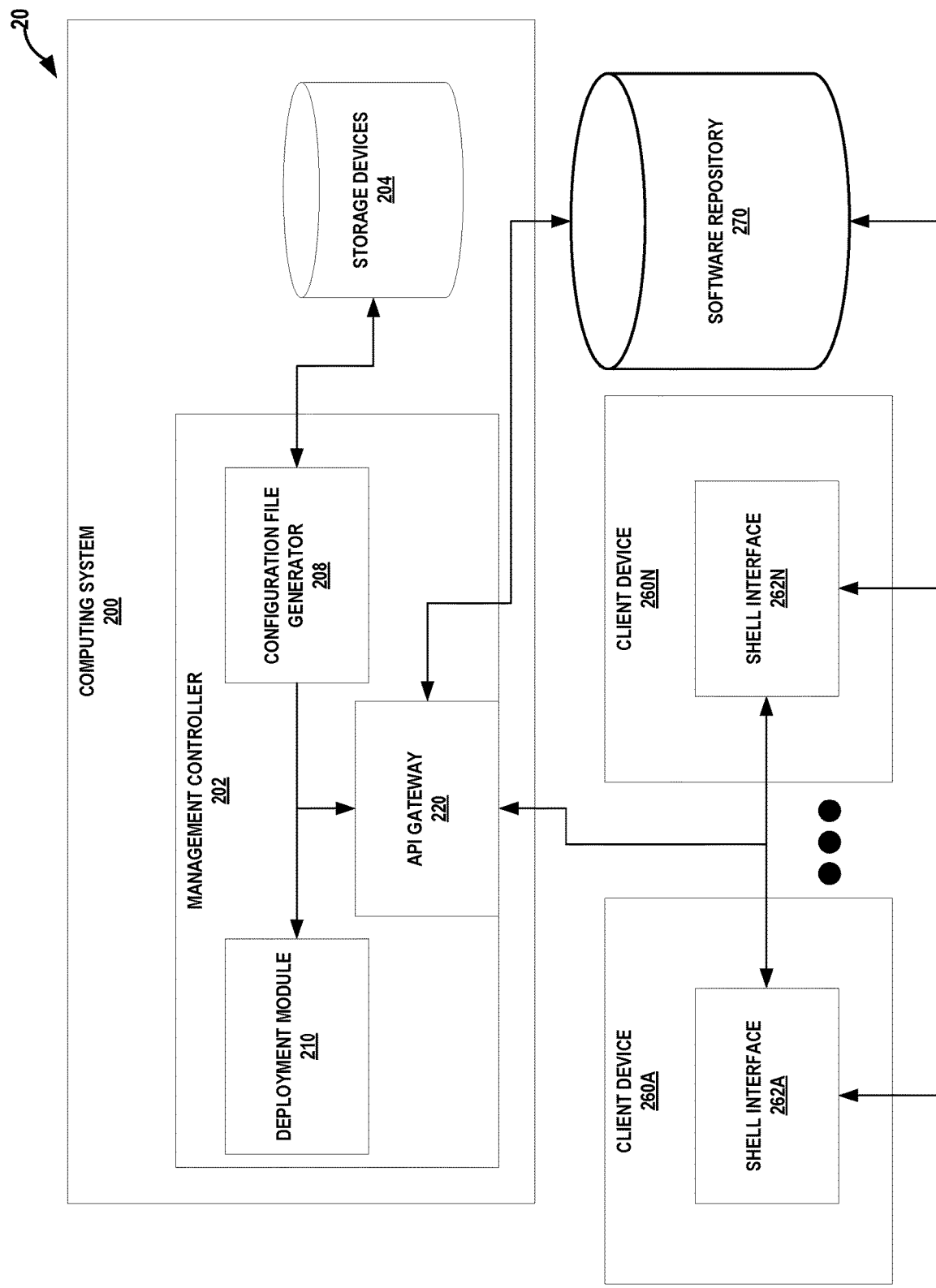
FIG. 2 is a block diagram illustrating an example computing environment with example details of a computing system managing deployment of software applications, in accordance with the techniques of this disclosure.

FIG. 2 is a block diagram illustrating example computing environment 20 for managing software applications, in accordance with the techniques of this disclosure. In the example of FIG. 2, computing environment 20 may include computing system 200, client devices 260A-260N, and software repository 270. Computing system 200, client devices 260A-260N, and software repository 270 of FIG. 2 may be described as an example or alternate implementation of computing system 100, consumer computing device 160, and software repository 170 of FIG. 1, respectively. One or more aspects of FIG. 2 may be described herein within the context of FIG. 1 for example purposes only. Computing system 200, client devices 260A-260N, and software repository 270 may be communicably coupled via network 101 of FIG. 1, for example.

Management controller 202 may include deployment module 210, configuration file generator 208, and Application Programming Interface (API) Gateway 220. A developer computing device (e.g., developer computing device 150 of FIG. 1) may upload a new version of a widget to software repository 270. Developer computing device 150 may, for example, upload a new version of a widget as a build artifact. Developer computing device 150 may upload the new version of the widget as a build artifact by wrapping the new version of the widget in a standardized format. Developer computing device 150 uploading the new version of the widget as a build artifact ensures that the new version of the widget is compatible with all other widgets managed by computing system 200.

Configuration file generator 208 may detect whether the new version of a widget has been uploaded to software repository 270. In some instances, configuration file generator 208 may poll software repository 270 periodically (e.g., every three seconds) or based on an event (e.g., product launch). In some examples, configuration file generator 208 may automatically poll and retrieve configuration information associated with an uploaded version of a widget. In this way, software repository 270 does not require customization to send notifications to computing system 200 that a new version of a widget has been uploaded. Configuration file generator 208 may use API Gateway 220 to retrieve configuration information associated with the new version of the widget. In some instances, configuration file generator 208 may only retrieve configuration information of widgets that have been uploaded in a standardized format (e.g., a build artifact).

Configuration file generator 208 may generate a configuration file for a widget based on widget configuration information retrieved from software repository 270. Configuration file generator 208 may generate a configuration file that is a structured representation of widget configuration information. For example, configuration file generator 208 may generate the configuration file to identify, for each widget of an application, a version of each widget and a respective location of where the corresponding version of each widget is stored. In some examples, the configuration file may include the version and one or more of a widget identifier, versions of widget dependencies, a uniform resource indicator (see FIG. 5). Configuration file generator 208 may generate a deployment-ready configuration file for an uploaded widget responsive to the uploaded widget satisfying quality assurance and security tests. For instance, configuration file generator 208 may generate a deployment-ready configuration file for an uploaded widget only when the uploaded widget satisfies quality assurance and security tests. Configuration file generator 208 may store configuration files in storage devices 204.

In some examples, configuration file generator 208 may generate multiple configuration files for a software application. Configuration file generator 208 may generate multiple configuration files for the software application in response to a new version of a widget implemented by the software application satisfying any pre-deployment requirements (e.g., quality assurance and security tests). For example, configuration file generator 208 may maintain a configuration file for a software application implementing a current version of a widget, as well as generate a configuration file for the same software application with indications that the software application should be implemented with the new version of the widget.

Management controller 202, and more specifically deployment module 210, may receive requests from client devices 260A-260N to access a software application. Client devices 260A-260N may request access to the software application with shell interfaces 262A-262N, respectively. Shell interfaces 262A-262N may send a request to access the software application to API Gateway 220. API Gateway 220 may receive the request to access the software application and relay the request to deployment module 210.

Deployment module 210 may generate a response to a request from client devices 260A-260N to access the software application. Deployment module 210 may generate a response that includes an indication of a configuration file including widget configuration information associated with the requested software application. Deployment module 210 may generate the response that includes either a configuration file including configuration information associated with a current version of the widget or a configuration file including configuration information associated with a new version of the widget. Deployment module 210 may generate the response to specify multiple widgets used to deploy the requested software application. For example, deployment module 210 may generate a response that includes configuration files associated with a plugin and one or more utility widgets used to deploy the requested software application.

A plugin may be a type of widget that includes data for a graphical user interface that outputs data associated with the one or more utility widgets underlying a software application. In some examples, a plugin may be a type of widget corresponding to a reference (e.g., uniform resource locator or URL) for a software application. A utility widget may be a type of widget that support functionality of a software application without including a frontend user interface. Utility widgets may be shared by different software applications due to the ensured compatibility according to the techniques described herein. Plugins and utility widgets may be assigned to a domain (e.g., a web domain such as domain.net) that is managed by software repository 270. References to a software application, or widgets of the software application, may be uniform resource indicators (URIs) that append the domain managed by software repository 270. For example, a software application may be assigned a domain of domain.net. The software application may include a widget that includes a reference to append the domain assigned to the software application, such as a reference of "/widget" that appends the domain to be "domain.net/widget."

Deployment module 210 may progressively generate a response to a request for a software application to include a new version of a widget used in the software application. Deployment module 210 may select a number of requests to receive a configuration file with configuration information associated with a new version of a widget uploaded by developer computing device 150. For example, deployment module 210 may select a percentage of requests from client devices 260A-260N as recipients of configuration information associated with a new version of a widget for the requested software application. Deployment module 210 may select a percentage of requests for the software application based on a window of time specified by developer computing device 150 when the new version of the widget was uploaded to software repository 270.

In some instances, after configuration file generator 208 generates a configuration file associated with a new version of a widget for a software application, deployment module 210 may only send the configuration file associated with the new version of the widget to a certain number of client devices 260A-260N. For example, client devices 262A, 262B, 262C, and 262N may send computing system 200 a request to access a software application that uses the widget in which developer computing device 150 uploaded a new version of. Computing system 200 may receive the requests with API Gateway 220. API Gateway 220 may relay the requests to deployment module 210. Deployment module 210 may generate a response to each request for the software application that implements the widget with a new version.

Deployment module 210 may generate responses the requests based on a time window developer computing device 150 specified when uploading the new version of the widget to software repository 270. Deployment module 210 may divide the time window into discrete phases. For example, deployment module 210 may divide the time window into four discrete phases. Deployment module 210 may generate a response to the requests for the software application that includes configuration information associated with a current version of the widget before the time window specified by developer computing device 150 has started. During the first phase, when the time window has started, deployment module 210 may only send a response that includes configuration information associated with the new version of the widget to client device 260A. Deployment module 210 may monitor runtime behavior of client device 260A executing the new version of the widget. Deployment module 210 may obtain one or more metrics associated with the runtime behavior of the new version of the widget. Deployment module 210 may determine whether the obtained metric(s) satisfy one or more configurable thresholds. In response to deployment module 210 determining all the configurable thresholds are satisfied, deployment module 210 may generate responses to send configuration information associated with the new version of the widget to client device 260A and client device 260B during the second phase of the time window. Deployment module 210 may generate responses that include configuration information associated with the new version of the widget for client devices 260A-260C when the third phase of the time window has started. In some examples, deployment module 210 may generate responses associated with the new version of the widget if deployment module 210 continues to determine that the runtime behavior of the new version of the widget is satisfying configurable thresholds while executing on client devices 260A and 260B. During the final phase of the time window or when the time window ends, deployment module 210 may generate responses with configuration information associated with the new version of the widget for all client devices 260A-260N.

Deployment module 210 may use a machine learning model to determine a rate at which deployment module 210 should select client devices 260A-260N as recipients of configuration information associated with a new version of a widget. For example, deployment module 210 may apply a machine learning algorithm to learn runtime behavior or characteristics associated with execution of the new version of the widget. Deployment module 210 may apply a machine learning model to output runtime characteristics associated with execution of the new version of the widget based on metrics obtained from client devices 260A-260N executing the new version of the widget. Deployment module 210 may use any well-known machine learning techniques to intelligently ramp up or roll back deployment of a new version of a widget used for requested software applications based on the outputted runtime characteristics. In some instances, computing system 200 may train a machine learning model to automatically determine a rate of deployment of a new version of a widget or whether a new version of a widget should be rolled back. Computing system 200 may train the machine learning model with instances of previous deployment behavior of other widgets managed by computing system 200.

Shell interfaces 262A-262N may execute a software application that includes the widget based on instructions and configuration information deployment module 210 included in a response to a request for the software application. For example, shell interface 262A may receive configuration information and instructions to execute a requested software application with a new version of a widget. Shell interface 262A may receive instructions from deployment module 210 to generate contextual information based on the configuration information included in the response. Shell interface 262A may generate contextual information based on properties specified in the configuration information (e.g., host properties, child properties, etc.). Shell interface 262A may use the generated contextual information to request software code files associated with the software application from software repository 270. Software repository 270 may fetch the requested software code files (e.g., widget(s)) and send the files to shell interface 262A. Shell interface 262A may receive the software code files and execute the software application based on the contextual information generated based on the configuration information and instructions sent from deployment module 210.

The techniques may provide one or more technical advantages that realize at least one practical application. Computing system 200 may provide a common knowledge base that facilitates the development, deployment, and execution of software applications throughout the CI/CD pipeline. For example, computing system 200 may allow developer computing device 150 to proactively manage deployment of a new version of a widget used in one or more software applications. Computing system 200 may allow a developer to configure an active deployment time window to regulate specific dates and times computing system 200 should transition consumer traffic to a new version of a widget. Computing system 200 may allow developer computing device 150 to configure operational threshold requirements. Developer computing device 150 may establish threshold operational requirements such as runtime, threads per second, etc. Developer computing device 150 may send the threshold requirements to computing system 200. Computing system 200 may obtain metrics related to the execution of a new version of a widget. Computing system 200 may automatically roll-back, slow down, or issue an alert to developer computing device 150 when a threshold requirement is not satisfied. In this way, computing system 200 provides developer computing device 150 with the flexibility to control the speed and quality assurance of the deployment of a new version of a widget used in a software application.

Figure 3:
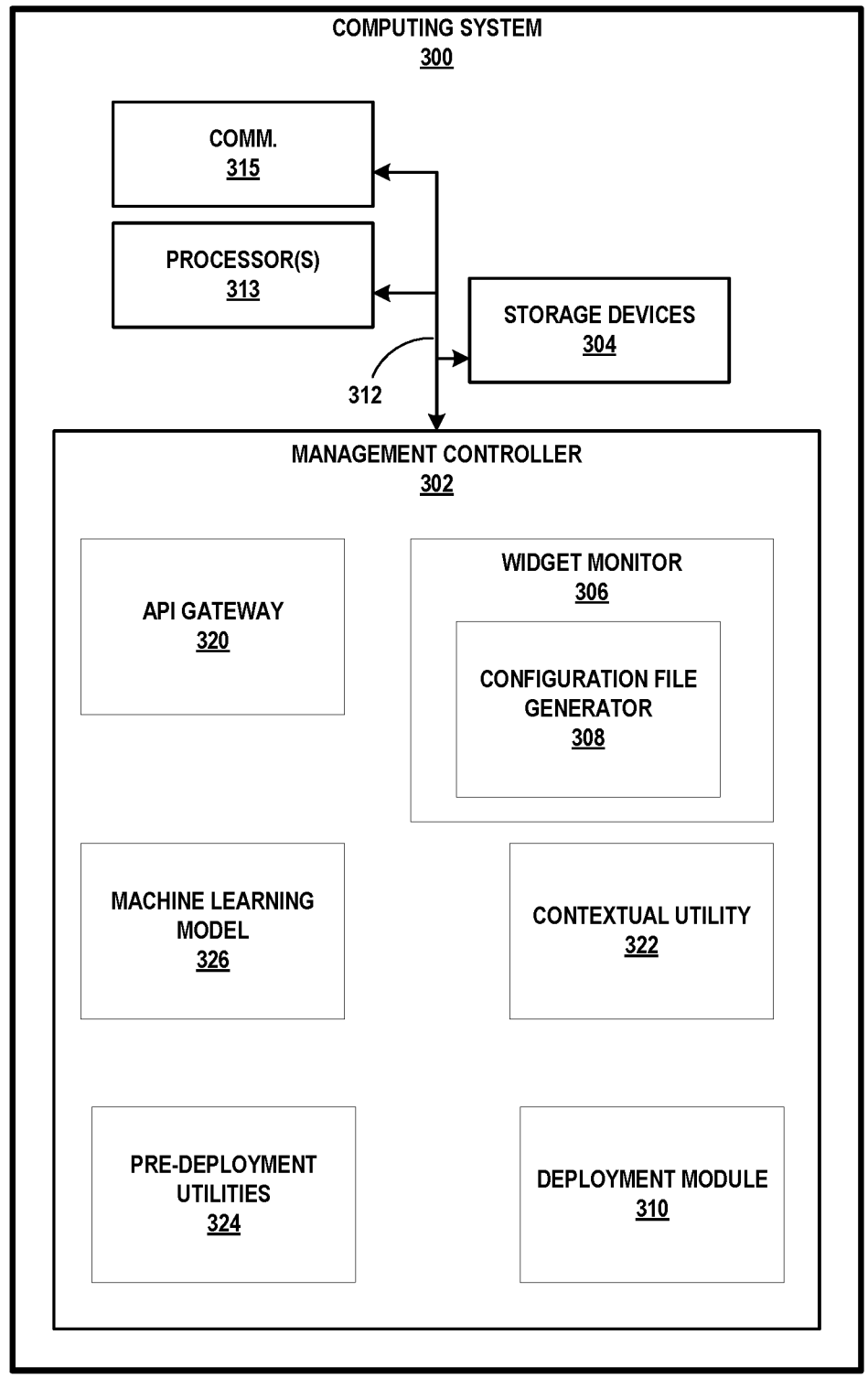
FIG. 3 is a block diagram illustrating an example computing system for managing software applications, in accordance with the techniques of this disclosure.

FIG. 3 is a block diagram illustrating example computing system 300 for managing software applications, in accordance with the techniques of this disclosure. Computing system 300 of FIG. 3 may be described as an example or alternate implementation of computing system 100 of FIG. 1 and/or computing system 200 of FIG. 2. One or more aspects of FIG. 3 may be described herein within the context of FIGS. 1 and 2 for example purposes only.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300 represents a cloud computing system, server farm, and/or server cluster (or portion thereof) that provides services to other devices or systems. Computing system 300 may represent or be implemented through one or more virtualized computer instances (e.g., virtual machines, containers) of a cloud computing system, server farm, data center, and/or server cluster.

In the example of FIG. 3, computing system 300 may include one or more processors 313, one or more communication units 315, storage devices 304, and management controller 302. One or more of the devices, modules, storage areas, or other components of computing system 300 may be interconnected to allow for inter-component communications (e.g., physically, communicatively, and/or operatively). In some examples, such connectivity may be provided by communication channels (e.g., communication channels 312), which may represent one or more of a system bus, a network connection, an inter-process communication data structure, or any other method for communicating data.

One or more communication units 315 of computing system 300 may communicate with devices external to computing system 300 by transmitting and/or receiving data, and may operate, in some respects, as both an input device and an output device. In some examples, communication units 315 may communicate with other devices over a network. In other examples, communication units 315 may send and/or receive radio signals on a radio network such as a cellular radio network. In other examples, communication units 315 of computing system 300 may transmit and/or receive satellite signals on a satellite network. Examples of communication units 215 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more processors 313 of computing system 300 may implement functionality and/or execute instructions associated with computing system 300 or associated with one or more modules illustrated herein and/or described below. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 300 may use one or more processors 313 to perform operations in accordance with one or more aspects of the present disclosure using software, hardware, firmware, or a mixture of hardware, software, and firmware residing in and/or executing at computing system 300.

One or more processors 313 (also referred to herein as "processors 313") may provide an operating environment or platform for various modules described herein, which may be implemented as software, but may in some examples include any combination of hardware, firmware, and software. One or more processors 313 may execute instructions of one or more modules. Processors 313 may retrieve, store, and/or execute the instructions and/or data of one or more applications, modules, or software. Processors 313 may also be operably coupled to one or more other software and/or hardware components, including, but not limited to, one or more of the components of computing system 300 and/or one or more devices or systems illustrated as being connected to computing system 300.

Processors 313 may implement functionality and/or execute instructions within computing system 300. For example, processors 313 may receive and execute instructions that provide the functionality of API Gateway 320, widget monitor 306, machine learning model 326, contextual utility 322, pre-deployment utilities 324, and deployment module 310. These instructions executed by processors 313 may cause computing system 300 to store and/or modify information within storage devices 304 or processors 313 during program execution. Processors 313 may execute instructions of API Gateway 320, widget monitor 306, machine learning model 326, contextual utility 322, pre-deployment utilities 324, and deployment module 310 to perform one or more operations. That is API Gateway 320, widget monitor 306, machine learning model 326, contextual utility 322, pre-deployment utilities 324, and deployment module 310 may be operable by processors 313 to perform various functions described herein.

Storage devices 304 within computing system 300 may store information for processing during operation of computing system 300 (e.g., computing system 300 may store data accessed by API Gateway 320, widget monitor 306, machine learning model 326, contextual utility 322, pre-deployment utilities 324, and deployment module 310 during execution at computing system 300). In some examples, storage devices 304 may include temporary memory, meaning that a primary purpose of storage devices 304 are not long-term storage. Storage devices 304 of computing system 300 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 304 may include one or more computer-readable storage media. Storage devices 304 may be configured to store larger amounts of information than volatile memory. Storage devices 304 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 304 may store program instructions and/or information associated with API Gateway 320, widget monitor 306, machine learning model 326, contextual utility 322, pre-deployment utilities 324, and deployment module 310.

Storage devices 304 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support the computing system 300. Storage devices 304 may be distributed across multiple devices or servers within a cloud computing environment provided by computing system 200.

Management controller 302 may include API Gateway 320, widget monitor 306, contextual utility 322, pre-deployment utilities 324, machine learning model 326, and deployment module 210. API Gateway 320 may be an API management tool that interfaces between computing devices and software repository 170 of FIG. 2. API Gateway 320 may act as an external server that forwards requests to access a software application (e.g., reverse proxy) to accept all API calls made by client devices. In this way, API Gateway 320 may allow computing system 300 to manage software applications by acting as an interface for client devices to request the appropriate components of a software application from a software repository or content delivery network.

Computing system 300 may maintain configuration files that include configuration information for various versions of widgets. Computing system 3200 may intelligently regulate which version of widgets are sent to particular requests by sending appropriate configuration files associated with configuration information for particular versions of widgets.

Widget monitor 206 may retrieve configuration information for a software application. Widget monitor 206 may receive configuration information specifying multiple widgets for deploying the software application. Widget monitor 206 may retrieve the configuration information via API Gateway 220.

In the example of FIG. 3, widget monitor 306 may include configuration file generator 308. In some instances, configuration file generator 308 may generate one or more configuration files based on configuration information retrieved from widget monitor 306. Widget monitor 306 may send the instructions to configuration file generator 308 to generate configuration files responsive to widget monitor 306 detecting a new version of a widget used to execute the software application has been uploaded. Configuration file generator 308 may generate a configuration file that includes the retrieved configuration information.

In some examples, widget monitor 306 may send instructions to configuration file generator 308 to generate a pre-deployment configuration file. Configuration file generator 308 may generate a pre-deployment configuration file based on a newly uploaded widget that has not been tested for quality assurance and security compliance. Pre-deployment utilities 324 may manage pre-deployment configuration files. Pre-deployment utilities 324 may also provide software utilities (SDKs, APIs, etc.) to software administrators to run quality assurance and security tests on a newly uploaded widget. For example, pre-deployment utilities 324 may provide tools for software administrators to assign a health score to a newly uploaded widget.

API Gateway 320 of management controller 302 may receive a request to execute a software application. In some instances, API Gateway 320 may obtain a request to execute a software application for managing an electronic document. Deployment module 310 may prepare a response to the request to execute the software application. Deployment module 310 may compile necessary configuration files for widgets used to execute the requested software application. Deployment module 310 may obtain the necessary configuration files from the configuration files stored in storage devices 304.

In some instances, deployment module 310 may include instructions generated by contextual utility 322 in a response to a request for a software application. Contextual utility 322 may generate instructions for loading widgets and data used to execute a software application. Contextual utility 322 may generate instructions to load a new version of a widget used to execute a software application based on configuration information associated with a version of the widget deployment module 310 selects.

In some examples, deployment module 310 may apply machine learning model 326 to determine whether to output instructions to execute a current version of the widget or the next version of the widget. Deployment module 310 may input metrics obtained from a client device executing the new version of the widget to machine learning model 326. Machine learning model 326 may output runtime characteristics associated with the execution of the new version of the widget. Deployment module 310 may determine whether to ramp-up or roll-back deployment of the new version of the widget based on the runtime characteristics output by machine learning model 326. Machine learning model 326 may be trained with instances of deployment behavior of multiple widgets managed by computing system 300.

Figure 4:
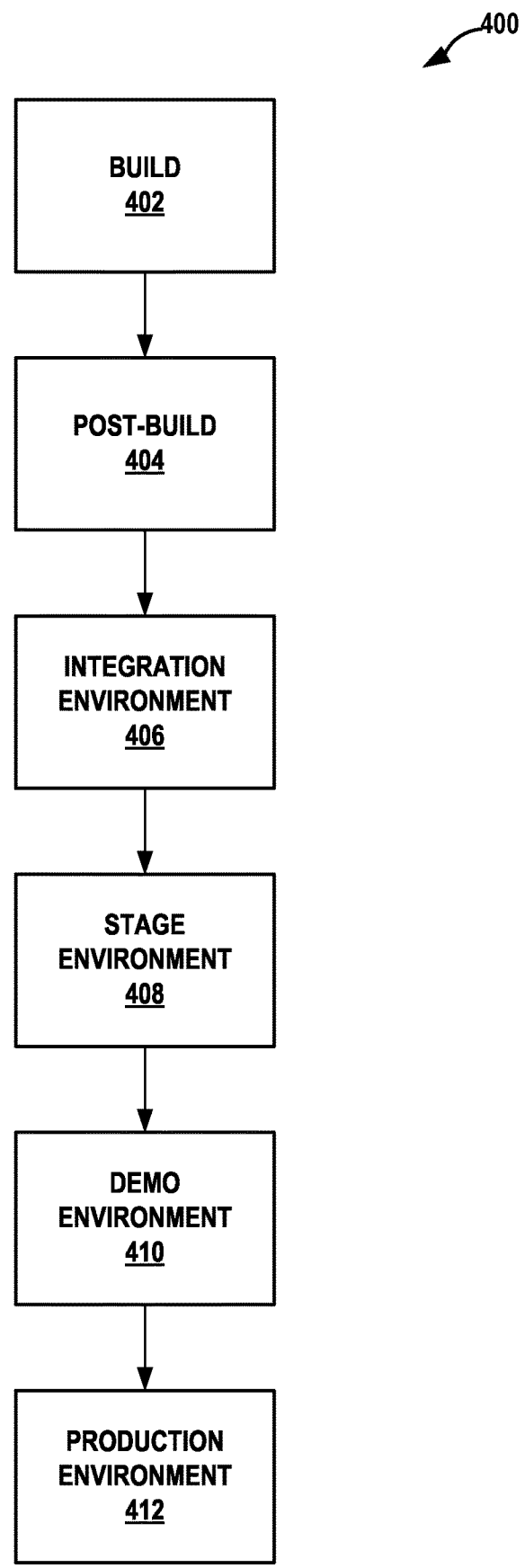
FIG. 4 is a conceptual diagram illustrating an example deployment lifecycle of a new version of a widget for a software application, in accordance with techniques of this disclosure.

FIG. 4 is a conceptual diagram illustrating an example deployment lifecycle 400 of a new version of a widget for a software application, in accordance with techniques of this disclosure. Deployment lifecycle 400 may include multiple, discrete environments associated with different stages in the deployment of a new version of a widget. In the example of FIG. 4, deployment lifecycle 400 may include build environment 402, post-build environment 404, integration environment 406, stage environment 408, demo environment 410, and production environment 412. One or more aspects of FIG. 4 may be described herein within the context of FIGS. 1-3 for example purposes only.

Build environment 402 may include a user of developer computing device 150 creating executable software code files for a new version of a widget used in implementing software applications. Build environment 402 may include the manual generation of executable programs by software developers using command line interface 152, for example. Post-build environment 404 may include developer computing device 150 executing software code files of a new version of a widget created in build environment 402. Post-build environment 404 may include a software developer locally testing a new version of a widget using command line interface 152. Integration environment 406 may include developer computing device 150 uploading a new version of a widget to software repository 170. In some instances, integration environment 406 may include computing system 100 determining whether the new version of the widget uploaded to software repository 170 was wrapped via a standardized format. In some examples, integration environment 406 may include quality assurance and/or security testing.

Stage environment 408 may include internal testing of the new version of the widget. Stage environment 408 may include software development teams mimicking behavior of consumer computing devices 260A-260N on the software developers' computing devices. In some instances, stage environment 408 may include performance testing. Stage environment 408 may include computing system 100 obtaining metrics from software developers executing the new version of the widget in various software application with consumer computing devices 260A-260N. Computing system 100 may obtain metrics such as Demo environment 410 may include external testing and/or demonstration of a new version of a widget. Demo environment 410 may include software development teams deploying a new version of a software application to consumer computing devices 260A-260N, where consumer computing devices 260 are operated by clients of the software development team. Demo environment 410 may include only deploying a new version of widget to consumer computing devices 260 associated with a select group of clients with pre-determined access to the new version of the widget.

Production environment 412 may include the deployment of a new version of a widget to the general public and/or to subscribers with access to the widget. Production environment 412 may be the final stage of the deployment of the new version of the widget. Production environment 412 may include receiving requests for a software application implementing the widget, sending configuration information and instructions to execute the requested software application, and accessing the software application by executing widgets implemented in the software application based on received configuration information and instructions. In some instances, production environment 412 may include strict deployment configuration thresholds to determine whether the new version of the widget is being executed according to quality assurance and/or security standards associated with a consumer-ready software application.

In accordance with aspects of this disclosure, computing system 100 may manage deployment of a new version of a widget in either demo environment 410 or production environment 412. For example, demo environment 410 may include client devices 260 that intend to demonstrate a new version of a widget. Demo environment 410 may include client devices 260 that demonstrate particular performance metrics of a new version of a widget. Demo environment 410 may include client devices 260 that demonstrate performance of the new version of the widget to close partners, for example, who are interested in observing performance of the new version of the widget prior to releasing the new version of the widget in production environment 412. Production environment 412 may include client devices 260 associated with consumers or customers of software applications managed by computing system 100.

In some instances, computing system 100 may roll back deployment of a new version of a widget when a new version of the widget does not satisfy criteria associated with demo environment 410 and/or production environment 412. For example, computing system 100 may roll back deployment of a new version of a widget in demo environment 410 in response to client device 260A executing the new version of the widget in a way that does not satisfy one or more threshold requirements. Computing system 100 may instruct all client devices 260 to execute a current or previous version of the widget. Computing system 100 may additionally move the new version of the widget back to any previous environment (e.g., stage environment 408, integration environment 406, etc.).

Figure 5:
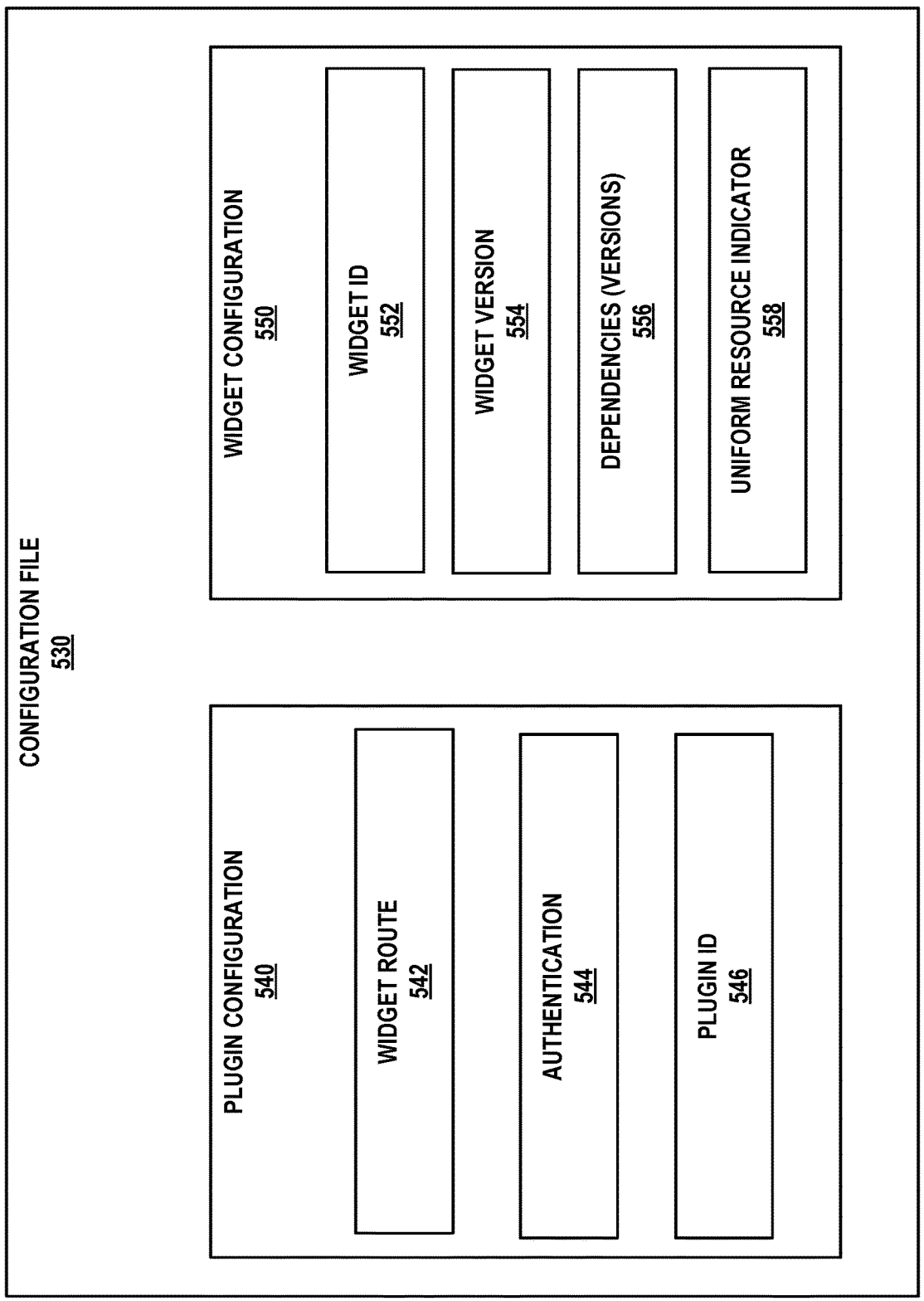
FIG. 5 is a conceptual diagram illustrating an example configuration file, in accordance with the techniques of this disclosure.

FIG. 5 is a conceptual diagram illustrating an example configuration file 530, in accordance with the techniques of this disclosure. In some instances, configuration file generator 308 of FIG. 3 may generate configuration file 530. Configuration file generator 308 may generate configuration file 530 in response to widget monitor 306 detecting a software application, or a new version thereof, associated with configuration file 530 has been uploaded.

In the example of FIG. 5, configuration file 530 may include configuration information for a software application uploaded to software repository 170 of FIG. 1, for example. Configuration file 530 may include plugin configuration 540 and widget configuration 550. Plugin configuration 540 may include configuration information corresponding to a plugin associated with a software application. A plugin may be a type of widget that includes data for a graphical user interface that outputs data associated with one or more utility widgets underlying a software application. In some instances, a plugin may be a type of widget corresponding to a reference (e.g., uniform resource locator or URL) for a software application Widget configuration 550 may include configuration information corresponding to a utility underlying functionality of the software application associated with configuration file 530. A utility widget may be a type of widget that support functionality of a software application without including a frontend user interface. Utility widgets may be shared by different software applications due to the ensured compatibility according to the techniques described herein. Plugins and utility widgets may be assigned to a domain (e.g., a web domain such as domain.net) that is managed by software repository 170. References to a software application, or widgets of the software application, may be uniform resource indicators (URIs) that append the domain managed by software repository 170. For example, a software application may be assigned a domain of domain.net. The software application may include a widget that includes a reference to append the domain assigned to the software application, such as a reference of "/widget" that appends the domain to be "domain.net/widget."

Plugin configuration 540 may include configuration information of a plugin for a software application associated with configuration file 530. Plugin configuration 540 may include configuration information, such as widget route 542, authentication 544, and plugin identification (plugin ID) 546. An example of plugin configuration 540 is as follows:

```
{
    "route":            "/home",
    "authenticated":    {
                            "type": "SSO",
                            "clientId": "XYZ123"
                        },
    "pluginID":         "@home-team/app"
}
```

Plugin ID 546 may include configuration information specifying a reference to the plugin providing the user interface for the software application associated with configuration file 530. For example, plugin ID 546 may include a uniform resource indicator (e.g., uniform resource locator or URL) for the plugin associated with the software application. Plugin ID 546 may include the configuration information used by a requesting computing device to load the plugin for the software application associated with configuration file 530. Plugin ID 546 may include instructions for a requesting computing device to pull the plug in associated with plugin ID 546 from a software repository (e.g., software repository 170 of FIG. 1).

Authentication 544 may include configuration information indicating whether a requesting computing device has the appropriate credentials to access the software application associated with configuration file 530. In some instances, management controller 102 of FIG. 1, for example, may provide instructions to a requesting computing device to input credentials to access the software application. Management controller 102 may receive the inputted credentials from the requesting computing device. Management controller 102 may verify whether the inputted credentials match credentials with access to the software application associated with configuration file 530. Authentication 544 may include configuration information associated with whether the inputted credentials have been verified. In some examples, authentication 544 may include a Boolean value indicating that a requesting computing device has provided the verified credentials to access the software application associated with configuration file 530.

Widget route 542 may include configuration information associated with references to utility widgets that include software code for processes that execute the software application associated with configuration file 530. Widget route 542 may be associated with a particular domain hosting the software application (e.g., domain.net). In some examples, widget route 542 may include uniform resource indicators (URIs) associated with each utility widget used to execute the software application. Widget route 542 may include a URI appending the domain hosting the software application (e.g., /widget). Widget route 542 may include a complete URI (e.g., uniform resource locator) to a utility widget associated with widget configuration 550, such as "domain.net/widget."

Widget configuration 550 may include configuration information, such as widget identification (widget ID) 552, version 554, dependencies 556, and uniform resource indicator (URI) 558. An example of widget configuration 550 is as follows:

```
{
    "widgetID": "@prepare PDF/app",
    "version": "2.0.6"
  "metadata": {
    "dependsOn": ["@PDF viewer/app" ]
    "URIs": ["preload.html", "/api/me" ]
    }
}
```

Widget ID 552 may be a tag or identifier for a utility widget associated with widget configuration 550. For example, widget ID 552 may be a tag assigned to the build artifact of the utility widget that was uploaded to a software repository (e.g., software repository 170 of FIG. 1). Version 554 may include configuration information associated with a version of the utility widget used to execute the software application associated with configuration file 530. In some instances, configuration file generator 308 of FIG. 3 may define version 554 based on whether configuration file 530 is a pre-deployment configuration file or a deployment configuration file. In examples where configuration file 530 is a pre-deployment configuration file, configuration file generator 308 may define version 554 based on a version of the utility widget that is undergoing pre-deployment testing (e.g., quality assurance and/or security testing). In examples where configuration file 530 is a deployment configuration file, configuration file generator 308 may define version 554 as a version of the utility widget that has satisfied quality assurance and security requirements.

In accordance with the techniques described herein, configuration file generator 308 may generate a new widget configuration 550 that includes configuration information associated with a new version of a widget. Deployment module 310 of FIG. 3, for example, may select one or more requests for software applications that implement the widget with the new version as recipients of the new version of the widget. Deployment module 310 may send widget configuration 550 associated with the new version of the widget in responses to requests selected as recipients of the new version of the widget. Deployment module 310 may send widget configuration information associated with the current version of the widget in responses to requests that were not selected as recipients of the new version of the widget. Deployment module 310 may select recipients of the new version of the widget based on a number of previous requests for software applications that implement the widget. For example, deployment module 310 may select a number of recipients based on a percentage of total requests for software applications that implement the widget.

Dependencies 556 may include configuration information identifying metadata specifying which, if any, utility widgets the utility widget associated with widget configuration 550 depends on. For example, widget configuration 550 may be associated with a utility widget that depends on another utility widget. In this example, dependencies 556 may include metadata identifying a reference to dependency widgets, as well as a version of the dependency widgets that the parent widget applies to execute processes of the software application associated with configuration file 530. In some examples, computing system 100 may generate a separate configuration file in response to a new version of a dependency widget defined in dependencies 566 being uploaded. Dependencies 556 may include a uniform resource indicator (e.g., uniform resource locator) associated with the version of the dependency widget the parent widget applies in execution of the software application. In some examples, widget configuration 550 may not include dependencies 556 if the widget associated with widget configuration 550 does not depend on any other widgets.

URI 558 may include configuration information on how to access the utility widget associated with widget configuration 550 from a software repository (e.g., software repository 170 of FIG. 1). In some instances, URI 558 may represent the URL specified in widget route 542 of plugin configuration 540. URI 558 may also represent the URL included in a widget configuration for another utility widget that depends on the widget associated with widget configuration 550. In some examples, URI 558 may represent a website URL (e.g., "domain.net/plugin/widget") that may be used by a consumer computing device to load the plugin and embedded widget associated with widget configurations 550 from a content delivery network or software repository. URI 558 provides utility widget specific configuration information that allows software developers and consumers to access a particular version of a software application from a content delivery network based on a version specified in version 554. In this way, the common knowledge base platform as described herein (e.g., computing system 100 of FIG. 1) may regulate deployment of various versions of software by intelligently sending configuration files specifying appropriate versions of widgets based on a requesting computing device. Computing system 100 may send a software developer computing device a pre-deployment configuration file that specifies untested versions of utility widgets for a requested software application, while sending consumer computing devices a deployment configuration file that specifies tested, stable versions of utility widgets for the requested software application.

Figure 6:
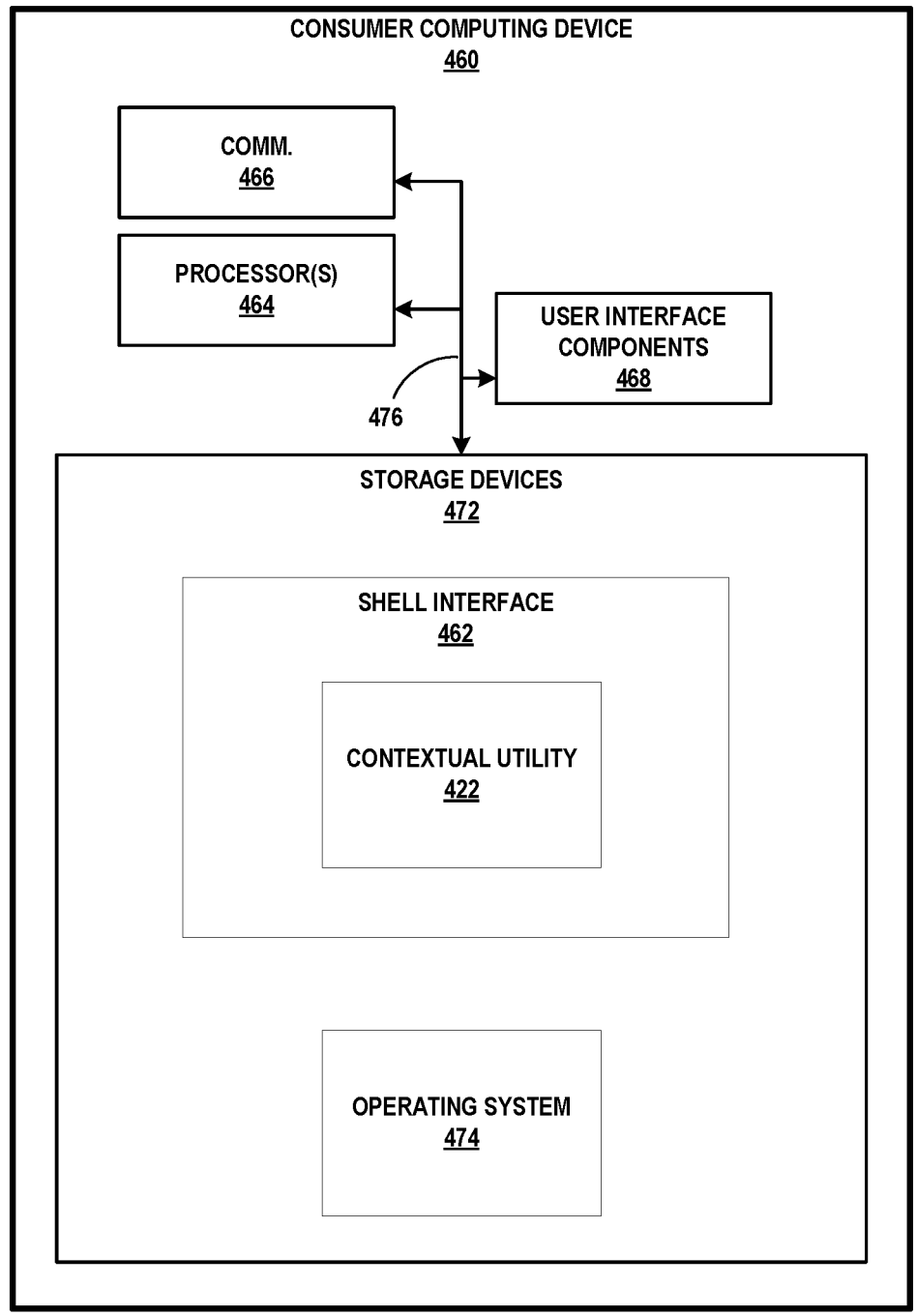
FIG. 6 is a block diagram illustrating an example consumer computing device, in accordance with the techniques of this disclosure.

FIG. 6 is a block diagram illustrating an example consumer computing device 460, in accordance with the techniques of this disclosure. Consumer computing device 460 may be an example of consumer computing device 160 of FIG. 1 or any of consumer computing devices 260A-260N of FIG. 2. FIG. 6 illustrates only one particular example of consumer computing device 460, and many other examples of consumer computing device 460 may be used in other instances and may include a subset of components included in example consumer computing device 460 or may include additional components not shown in FIG. 6.

In the example of FIG. 6, consumer computing device 460 may include processors 464, communication units 466, user interface (UI) components 468, and storage devices 472. Communication channels 476 ("COMM channel 476") may interconnect each of the components 464, 466, 468, and 472 for inter-component communications (physically, communicatively, and/or operatively). In some examples, communication channel 476 may include a system bus, a network connection, an inter-process communication data structure, or any other method for communicating data.

In some examples, UI components 468 may be a presence-sensitive display configured to detect input (e.g., touch and non-touch input) from a user of consumer computing device 460. UI components 468 may output information to a user in the form of a UI, which may be associated with functionality provided by consumer computing device 460. Such UIs may be associated with computing platforms, operating systems, applications, and/or services executing at or accessible from consumer computing device 460 (e.g., electronic message applications, chat applications, Internet browser applications, mobile or desktop operating systems, social media applications, electronic games, menus, and other types of applications).

Processors 464 may implement functionality and/or execute instructions within consumer computing device 460.

For example, processors 464 may receive and execute instructions that provide the functionality of shell interface 462 and operating system (OS) 474. These instructions executed by processors 464 may cause consumer computing device 460 to store and/or modify information within storage devices 472 or processors 464 during program execution. Processors 464 may execute instructions of shell interface 462 and OS 474 to perform one or more operations. That is shell interface 462 and OS 474 may be operable by processors 464 to perform various functions described herein.

In the example of FIG. 6, communication units 466 of consumer computing device 460 may communicate with one or more external devices via one or more wired and/or wireless networks by transmitting and/or receiving network signals on the one or more networks. Examples of communication units 466 include a network interface card (e.g., such as an Ethernet card), an optical transceiver, a radio frequency transceiver, a GNSS receiver, or any other type of device that can send and/or receive information. Other examples of communication units 466 may include short wave radios, cellular data radios (for terrestrial and/or satellite cellular networks), wireless network radios, as well as universal serial bus (USB) controllers.

In the example of FIG. 6, storage devices 472 may include operating system (OS) 474 and shell interface 462. Storage devices 472 within consumer computing device 460 may store information for processing during operation of consumer computing device 460 (e.g., consumer computing device 460 may store data accessed by shell interface 462 and OS 474 during execution at consumer computing device 460). In some examples, storage devices 472 may be a temporary memory, meaning that a primary purpose of storage devices 472 is not long-term storage. Storage devices 472 on consumer computing device 460 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 472 may include one or more computer-readable storage media. Storage devices 472 may be configured to store larger amounts of information than volatile memory. Storage devices 472 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 472 may store program instructions and/or information associated with shell interface 462 and OS 474.

Storage devices 472 may include OS 474. OS 474 may control the operation of components of consumer computing device 460. For example, OS 474 may facilitate the communication of shell interface 462 with processor 464, storage devices 472, and communication units 466. In some examples, OS 474 may manage interactions between software applications and a user of consumer computing device 460. OS 474 may have a kernel that facilitates interactions with underlying hardware of consumer computing device 460 and provides a fully formed application space capable of executing a wide variety of software applications having secure partitions in which each of the software applications executes to perform various operations. In some examples, UI components 468 may be considered a component of OS 474.

Storage devices 472 may include shell interface 462. Shell interface 462 may include a website browser interface. In some instances, shell interface 462 may be a website browser application. Shell interface 462 may include instructions on how to request software applications from computing system 100. In some examples, shell interface 462 may include instructions on how to execute a software application requested from computing system 100. In the example of FIG. 6, shell interface 462 may include contextual utility 422. Contextual utility 422 may include instructions from computing system 100 on how shell interface 462 should execute a requested software application.

In accordance with the techniques described herein, consumer computing device 460 may execute a software application for managing electronic documents. For example, shell interface 462 of computing device 460 may send a request to computing system 100 to access a software application implemented with multiple widgets. Shell interface 462 may output a text field to allow a user operating consumer computing device 460 to input a request for a software application (e.g., a user inputting a website address). Shell interface 462 may send a request to computing system 100 for access to a software application with communication units 466. Communication units 466 may receive a response generated by computing system 100 that includes configuration information associated with widgets implemented in the software application, as well as instructions to execute the software application. Communication units 466 may relay the response generated by computing system 100 to shell interface 462 via communication channels 476. Contextual utility 422 of shell interface 462 may process the instructions to execute the software application by generating contextual properties based on configuration information associated with the widgets implemented in the requested software application. Shell interface 462 may execute the software application by requesting widgets and data implemented in the software application from software repository 170 based on the contextual properties generated by contextual utility 422.

Figure 7:
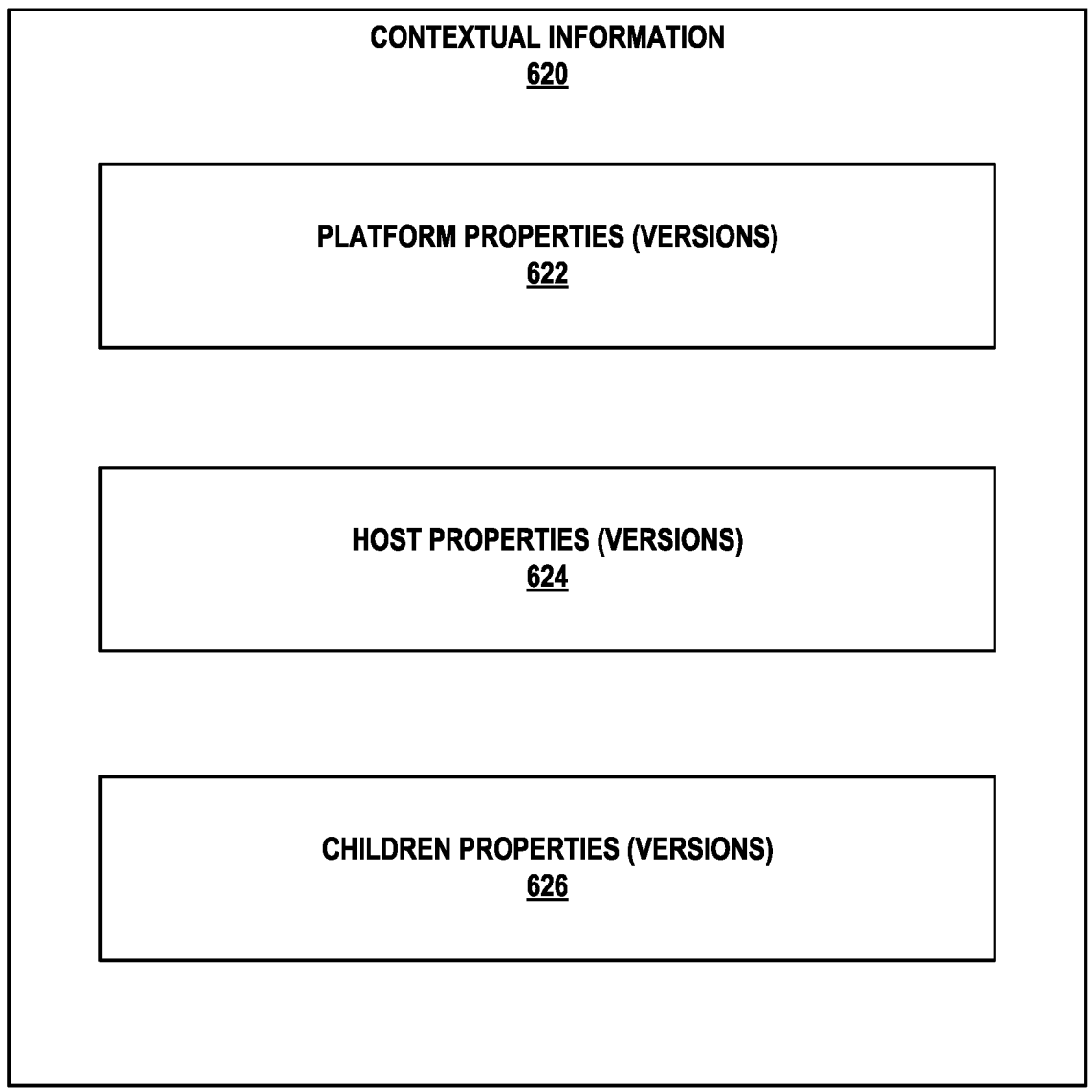
FIG. 7 is a conceptual diagram illustrating example contextual information used to load a software application, in accordance with the techniques of this disclosure.

FIG. 7 is a conceptual diagram illustrating example contextual information 620 used to load a software application, in accordance with the techniques of this disclosure. In some instances, contextual information 620 may be generated by command line interface 152 of developer computing device 150 and/or shell interface 162 of consumer computing device 160, of FIG. 1. Shell interface 162, for example, may generate contextual information 620 responsive to instructions from computing system 100 of FIG. 1. Shell interface 162 may generate contextual information 620 based on received configuration information associated with a requested software application. For example, shell interface 162 may generate contextual information 620 based on a received configuration file (e.g., configuration file 530 of FIG. 5) associated with a requested software application. Shell interface 162 may generate contextual information 620 based on plugin configuration 540, for example. Shell interface 162 may generate contextual information 620 based on a utility provided by the common knowledge base platform (e.g., contextual utility 322 of FIG. 3).

In the example of FIG. 7, contextual information 620 may include instructions to load widgets and data for a software application. Contextual information 620 may organize instructions to load widgets and data for a software application into domain properties. Contextual information 620 may include domain properties corresponding to a dependency hierarchy of a software application. For example, contextual information 620 may include platform properties 622, host properties 624, and children properties 626.

Platform properties 622 may include instructions to load a software application based on platform data of the requesting computing device. For example, platform properties 622 may include instructions to load the software application based on platform data associated with a deployment environment (e.g., demo environment 410 or production environment 412 of FIG. 4) the common knowledge base platform (e.g., computing system 100 of FIG. 1) will send configuration information to, a browser with a command line interface (e.g., shell interface 162 of FIG. 1) to access and execute the software application, data of a user account associated with the requesting computing device, an authentication state of the requesting computing device, a language preference of a user operating the requesting computing device, font information for presenting an electronic document, a runtime widget hierarchy, and utilities provided by the common knowledge base platform. In some examples, platform properties 622 may be generated based on plugin configuration information 540 of FIG. 5. In addition, shell interface 162 may alter the platform data included in platform properties 622. For example, shell interface 162 may specify font information (e.g., size of font, color of font, etc.) for presenting an electronic document.

Host properties 624 may include instructions to load the software application based on a host widget. For example, host properties 624 may include instructions to load the software application based on contextual information associated with feature flags included in the host widget, a configuration API of the host widget, data used to execute the host widget, and dependent functions the host widget uses. For example, host properties 624 may include instructions based on host data that specifies a utility widget that includes processes for the software application. Host properties 624 may include instructions for shell interface 162 to load the utility widget, even before a user operating consumer computing device 160 executes the processes of the widget.

Host properties 624 may be generated based on widget configuration 550 of FIG. 5. For example, host properties 624 may be generated to include instructions based on host data associated with dependent functions the host widget uses. Host properties 624 may include instructions generated based on dependencies 556 of widget configuration 550, indicating where to access versions of utility widget a host widget depends on. In some instances, host properties 624 may include instructions to execute a new version of a widget in response to computing system 100 selecting shell interface 162 as a recipient of the new version of the widget. Host properties 624 may include instructions to execute the current or a previous version of a widget in response to computing system 100 not selecting shell interface 162 as a recipient of the new version of the widget during the phased deployment of the new version of the widget.

Host properties 624 may be generated based on host data such as metadata specifying a host widget (e.g., plugin). In some instances, a host widget may be a plugin that exposes an API for other widgets to apply in processes for the software application. Host properties 624 may allow the other widgets to use the API exposed by the host widget by including configuration, bootstrapping, and initialization information of the API.

Children properties 626 may include instructions to load the software application based on children widgets used by a host widget. For example, children properties 626 may include instructions to load the software application based on children data associated with a host widget using a child widget as a wrapper or a high order component (HOC). Children properties 626 may be generated based on widget configuration 550 of FIG. 5. For example, children properties 626 may be generated to include instructions based on contextual information associated with dependent functions the host widget uses. Children properties 626 may include instructions generated based on dependencies 556 of widget configuration 550, indicating where to access versions of utility widget a host widget depends on. In some instances, children properties 626 may include instructions to execute a new version of a widget in response to computing system 100 selecting shell interface 162 as a recipient of the new version of the widget. Children properties 626 may include instructions to execute the current or a previous version of a widget in response to computing system 100 not selecting shell interface 162 as a recipient of the new version of the widget during the phased deployment of the new version of the widget.

Contextual information 620 may allow a requesting computing device to load all widgets and data associated with a software application in parallel. In typical deployment schemes, a requesting computing device loads widgets and data sequentially by making requests to access software and data in a sequential order. Contextual information 620, rather provides properties of the software application based on various domains with instructions for the requesting computing device to load all widgets and data specified in contextual information 620 at one time. Contextual information 620 includes instructions to quickly load all components of a software application to provide a user of the requesting computing device a seamless experience executing various processes included in the software application.

In accordance with the techniques of this disclosure, contextual information 620 may include instructions to execute either a current version of a widget or a new version of the widget. Contextual information 620 may include instructions to execute the new version of the widget in response to computing system 100 selecting shell interface 162 at a recipient of the new version of the widget. In some instances, contextual information 620 may include instructions to execute the current version of the widget in response to computing system 100 determining that the deployment of the new version of the widget should be rolled back based on performance metrics associated with the execution of the new version of the widget not satisfying criteria. For example, contextual information 620 may initially include instructions to execute the new version of the widget. Shell interface 162 may execute a software application including the new version of the widget based on contextual information 620. Shell interface 162 may send computing system 100, via API Gateway 220, performance metrics associated with the execution of the software application and/or the new version of the widget. In response to computing system 100 determining the obtained metrics do not satisfy performance, quality assurance, security, or other types of requirements, computing system 100 may send instructions to shell interface 162 to update contextual information 620. Computing system 100 may send instructions to shell interface 162 to update contextual information 620 with instructions to execute the current or a previous version of the widget that computing system 100.

In some instances, contextual information 620 may include instructions to execute the current version of the widget in response to computing system 100 not selecting shell interface as a recipient of the new version of the widget in a particular phase. Computing system 100 may subsequently select shell interface 162 as a recipient of instructions to execute the new version of the widget in a later phase. Computing system 100 may send instructions to shell interface 162 to update contextual information 620 with instructions to execute the new version of the widget.

Figure 8:
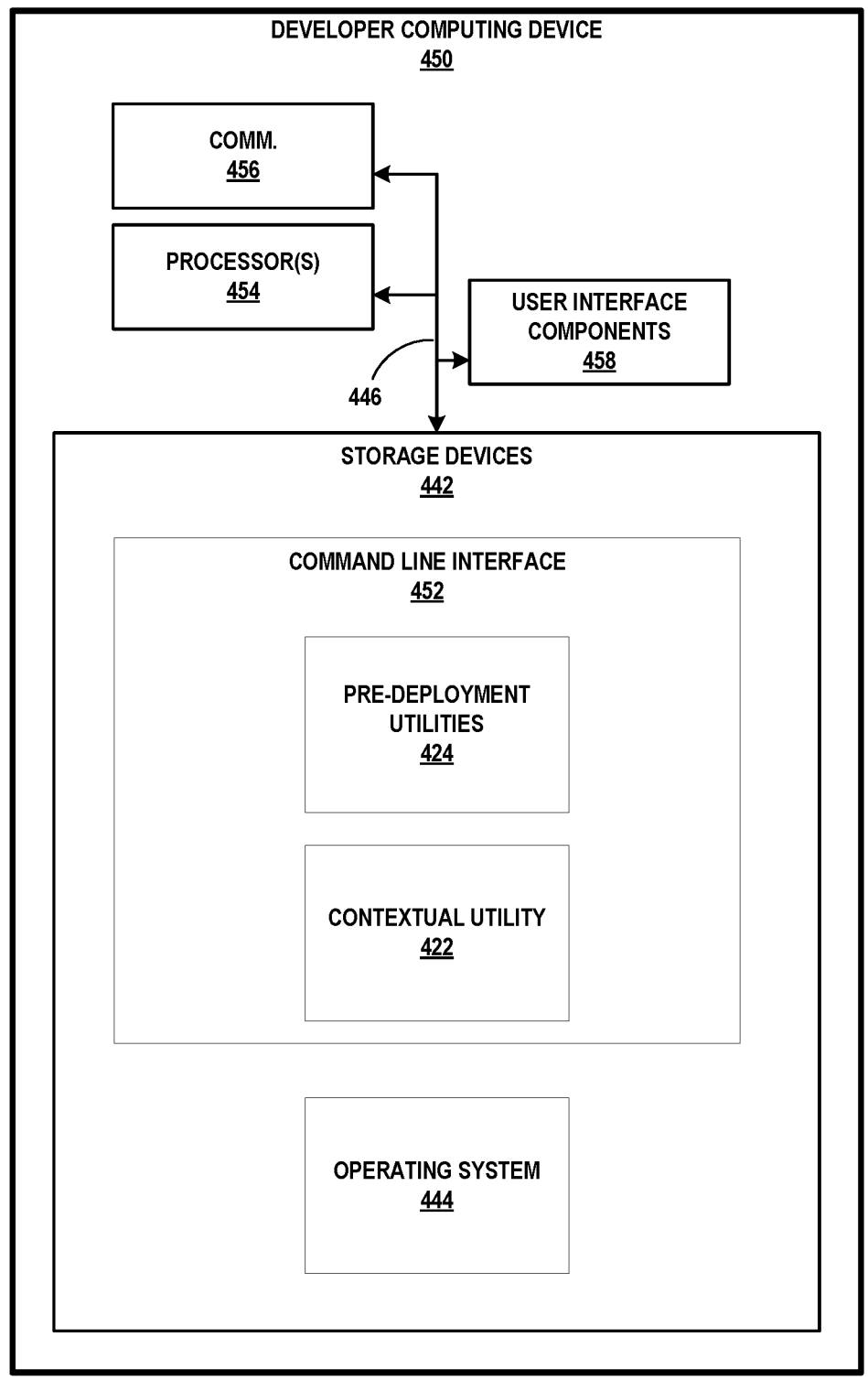
FIG. 8 is a block diagram illustrating an example developer computing device, in accordance with the techniques of this disclosure.

FIG. 8 is a block diagram illustrating an example developer computing device 450, in accordance with the techniques of this disclosure. Developer computing device 450 may be an example of developer computing device 150 of FIG. 1. FIG. 8 illustrates only one particular example of developer computing device 450, and many other examples of developer computing device 450 may be used in other instances and may include a subset of components included in example developer computing device 450 or may include additional components not shown in FIG. 8.

In the example of FIG. 8, developer computing device 450 may include processors 454, communication units 456, user interface (UI) components 458, and storage devices 442. Communication channels 446 ("COMM channel 446") may interconnect each of the components 442, 454, 456, and 458 for inter-component communications (physically, communicatively, and/or operatively). In some examples, communication channel 446 may include a system bus, a network connection, an inter-process communication data structure, or any other method for communicating data.

In some examples, UI components 458 may be a presence-sensitive display configured to detect input (e.g., touch and non-touch input) from a user of developer computing device 450. UI components 458 may output information to a user in the form of a UI, which may be associated with functionality provided by developer computing device 450. Such UIs may be associated with computing platforms, operating systems, applications, and/or services executing at or accessible from developer computing device 450 (e.g., electronic message applications, chat applications, Internet browser applications, mobile or desktop operating systems, social media applications, electronic games, menus, and other types of applications).

Processors 454 may implement functionality and/or execute instructions within developer computing device 450. For example, processors 454 may receive and execute instructions that provide the functionality of command line interface 452 and operating system (OS) 444. These instructions executed by processors 454 may cause developer computing device 450 to store and/or modify information within storage devices 442 or processors 454 during program execution. Processors 454 may execute instructions of command line interface 452 and OS 444 to perform one or more operations. That is command interface 452 and OS 444 may be operable by processors 454 to perform various functions described herein.

In the example of FIG. 8, communication units 456 of developer computing device 450 may communicate with one or more external devices via one or more wired and/or wireless networks by transmitting and/or receiving network signals on the one or more networks. Examples of communication units 456 include a network interface card (e.g., such as an Ethernet card), an optical transceiver, a radio frequency transceiver, a GNSS receiver, or any other type of device that can send and/or receive information. Other examples of communication units 456 may include short wave radios, cellular data radios (for terrestrial and/or satellite cellular networks), wireless network radios, as well as universal serial bus (USB) controllers.

In the example of FIG. 6, storage devices 442 may include operating system (OS) 444 and command line interface 452. Storage devices 442 within developer computing device 450 may store information for processing during operation of developer computing device 450 (e.g., developer computing device 450 may store data accessed by command line interface 452 and OS 444 during execution at developer computing device 450). In some examples, storage devices 442 may be a temporary memory, meaning that a primary purpose of storage devices 442 is not long-term storage. Storage devices 442 on developer computing device 450 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 442 may include one or more computer-readable storage media. Storage devices 442 may be configured to store larger amounts of information than volatile memory. Storage devices 442 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 442 may store program instructions and/or information associated with command line interface 452 and OS 444.

Storage devices 442 may include OS 444. OS 444 may control the operation of components of developer computing device 450. For example, OS 444 may facilitate the communication of command line interface 452 with processors 454, storage devices 442, and communication units 456. In some examples, OS 444 may manage interactions between software applications and a user of developer computing device 450. OS 444 may have a kernel that facilitates interactions with underlying hardware of developer computing device 450 and provides a fully formed application space capable of executing a wide variety of software applications having secure partitions in which each of the software applications executes to perform various operations. In some examples, UI components 458 may be considered a component of OS 444.

Storage devices 442 may include command line interface 452. Command line interface 452 may include a shell interface, a software development kit, an application programming interface, or any other interface a software developer can use to create and execute software code. In the example of FIG. 8, command line interface 452 may include pre-deployment utilities 424 and contextual utility 422. Contextual utility 422 may include instructions received from computing system 100 on how to execute software applications implemented by multiple widgets. Contextual utility 422 may include similar functionality to contextual utility 422 of FIG. 6.

In accordance with the techniques described herein, command line interface 452 may upload a new version of a widget to software repository 170. Pre-deployment utilities 424 may include instructions received from computing system 100. Pre-deployment utilities 424 of command line interface 452 may output an option to a user, via UI components 458, to input deployment configuration associated with thresholds representing required performance metrics associated with a particular environment (e.g., demo environment 410 or production environment 412 of FIG. 4).

Examples of deployment configurations are discussed throughout this disclosure, such as in the description of FIG. 9 below. Pre-deployment utilities 424 may include instructions for quality assurance and/or security testing command line interface 452 may perform on new developed widgets.

FIG. 9 is a conceptual diagram illustrating an example deployment configuration 650 for a new version of a widget, in accordance with techniques of this disclosure. FIG. 9 is discussed with FIGS. 1-8 for example purposes only. In the example of FIG. 9, deployment configuration 650 may include environment 652, widget version information 654, metric thresholds 656, and time window 658.

Environment 652 may include an environment (e.g., demo environment 410 or production environment 412 of FIG. 4) a developer wants to deploy a new version of a widget to. For example, pre-deployment utilities 424 of FIG. 8 may include instructions to output, via UI components 458, an option for a user of developer computing device 450 to select either a demo environment or production environment. In the example of FIG. 9, deployment configuration 650 may include an indication of a software developer selecting a demo environment.

Widget version information 654 may include a reference to a widget associated with the new version of the widget developer computing device 450 will deploy. Widget version information 654 may include a widget route specifying a URI associated with the widget and a version number associated with the new version of the widget that will be deployed. In some instances, pre-deployment utilities of FIG. 8 may include instructions to output, via UI components 458, an option for a user of developer computing device 450 to input values for 'widget route' and 'version.' In the example of FIG. 9, deployment configuration 650 may include an indication for deploying a new version '1.2.3' of a 'PDFviewer' widget that may be located at 'domain.net/pdfViewer.'

Metric thresholds 656 may include configuration threshold criteria associated with expectations for the runtime execution of a new version of a widget defined in widget version information 654. In some instances, pre-deployment utilities of FIG. 8 may include instructions to output, via UI components 458, an option for a user of developer computing device 450 to optionally change metric threshold criteria associated with runtime execution of the new version of the widget defined in widget version information 654. If developer computing device 450 does not receive any input from the user operating developer computing device 450 indicating a desire to change execution threshold criteria, metric thresholds 656 may include widget execution threshold criteria established by a software application administrator (e.g., an administrator managing computing system 100 of FIG. 1). In the example of FIG. 9, metric thresholds 656 may enable a user of developer computing device 450 to 'change performance variables,' 'change allowable number of errors or warnings,' 'change application launch time threshold,' and/or 'change widget load time threshold.' Metric thresholds 656 may allow a user to change threshold criteria associated performance variables such as computer processing unit (CPU) performance (e.g., clock cycles, power consumption, etc.), memory performance, graphics processing unit (GPU) performance, and/or battery performance. Metric thresholds 656 may allow a user to configure a threshold criterion associated with a number of allowable errors or warnings that may occur during execution of the new version of the widget. For example, metric thresholds 656 may define a minimum number of allowable compilation errors or warnings that may occur during the execution of the new version of the widget on a client device (e.g., consumer computing device 160 of FIG. 1)

Metric thresholds 656 may allow a user to change threshold criteria associated with application launch time. For example, metric thresholds 656 may define a maximum allowable application launch time threshold defining a criterion for the maximum amount of time an application implementing the new version of the widget should launch on a client device (e.g., consumer computing device 160 of FIG. 1). Metric thresholds 656 may allow a user to change threshold criteria associated with widget load time. For example, metric thresholds 656 may define a maximum allowable widget load time threshold defining a criterion for the maximum among of time the new version of the widget should take to load on a client device (e.g., consumer computing device 160 of FIG. 1).

In response to an application implementing the new version of the widget not satisfying the application launch time criteria, computing system 200, or more specifically deployment module 210 of FIG. 2, may pause deployment of the new version of the widget, roll-back deployment of the new version of the widget, and/or issue a warning to developer computing device 450 that uploaded the new version of the widget. In response to the execution of the new version of the widget not satisfying the widget load time criteria defined in metric thresholds 656, deployment module 210 may pause deployment of the new version of the widget, roll-back deployment of the new version of the widget, and/or issue a warning to developer computing device 450 that uploaded the new version of the widget. Similarly, in response to execution of the new version of the widget not satisfying criteria associated with performance variables and/or the allowable number of errors or warnings, deployment module 210 may pause deployment of the new version of the widget, roll-back deployment of the new version of the widget, and/or issue a warning to developer computing device 450 that uploaded the new version of the widget. Deployment module 210 may obtain metrics associated with metric thresholds 656 from a client device that has been selected and is executing the new version of the widget in any software application that implements the new version of the widget.

Time window 658 may include a specific period of time for the progressive deployment of the new version of the widget specified in deployment configuration 650. Time window 658 may define the period of time the new version of the widget specified in widget version information 654 will be progressively deployed to client devices requesting software applications that implement the widget. In some instances, pre-deployment utilities of FIG. 8 may include instructions to output, via UI components 458, an option for a user of developer computing device 450 to input values for a 'start time' and an 'end time' for progressive deployment of the new version of the widget. Time window 658 may define a start time and end time according to a UNIX timestamp. In the example of FIG. 9, time window 658 defines a start time with a UNIX timestamp of '1682348458' which corresponds to Apr. 24, 2023 11:00 AM Eastern Time. Time window 658, in the example of FIG. 9, defines an end time with a UNIX timestamp of '1682352058' which corresponds to Apr. 24, 2023 12:00 PM Eastern Time.

In accordance with the techniques described herein, deployment module 210 may apply deployment configuration 650 when generating responses to requests for software applications implementing a widget associated with the widget defined in widget version information 654. For example, client devices 260A-260N may be operated by users specific to demo environment 410 of FIG. 4. Client devices 260A-260N may request a software application that implements a widget associated with a new version of a widget uploaded by developer computing device 150. Prior to the time defined as the start time in time window 658 (e.g., prior to Apr. 24, 2023 11:00 AM Eastern Time), deployment module 210 sends configuration information and instructions to execute the software application with a current version of the widget. After the start time defined in time window 658, deployment module 210 may select one or more requests for software applications that implement the widget as recipients of the new version of the widget. For example, deployment module 210 may determine and/or refresh a number of requests for software applications that implement the widget every five seconds during the time period defined in time window 658. As time approaches the end time defined in time window 658, deployment module 210 may progressively increase a percentage of the number of requests that may receive instructions to execute the new version of the widget.

Throughout the progressive deployment of the new version of the widget, deployment module 210 may obtain metrics from client devices 260A-260N that are currently executing the new version of the widget. Deployment module 210 may determine whether the obtained metrics satisfy criteria defined in metric thresholds 656. In response to the obtained metrics satisfying all the criteria defined in metric thresholds 656, deployment module 210 may continue to increase the percentage of requests selected as recipients of the new version of the widget until all requests are instructed to execute the new version of the widget at or shortly after the time defined in the end time of time window 658. In response to the obtained metrics not satisfying at least one criterion defined in metric thresholds 656, deployment module 210 may pause selecting requests as recipients of the new version of the widget, send responses to all requests that include a current version of the widget, and/or issue a warning to developer computing device 150 that uploaded the new version of the widget.

Figure 10:
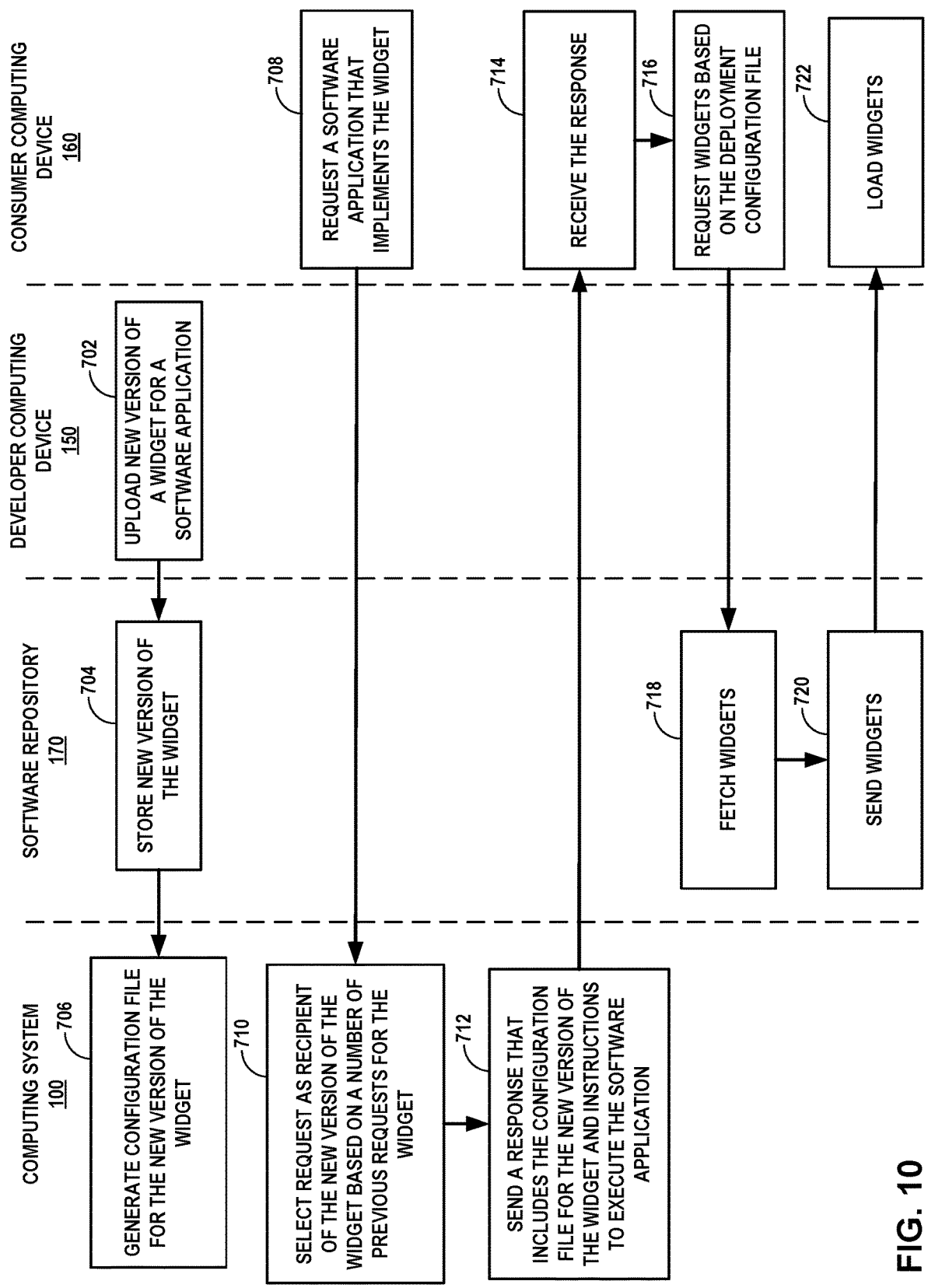
FIG. 10 is a flow chart illustrating an example mode of operation for managing deployment of software applications, in accordance with the techniques of this disclosure.

FIG. 10 is a flow chart illustrating an example mode of operation for managing deployment of software applications, in accordance with the techniques of this disclosure. FIG. 10 is discussed with FIGS. 1-9 for example purposes only. In the example of FIG. 10, computing system 100, software repository 170, developer computing device 150, and consumer computing device 160 may correspond to computing system 100, software repository 170, developer computing device 150 and consumer computing device 160 of FIG. 1.

Developer computing device 150 may upload a new version of a widget for a software application to software repository 170 (702). Developer computing device 150 may upload a new version of the widget in demo environment 410 or production environment 412 of FIG. 4. Developer computing device 150 may upload a new version of a widget that was tested using pre-deployment utilities provided by computing system 100. Developer computing device 150 may upload a new version of the widget for the software application to software repository 170 in response to the new version of the widget satisfying pre-deployment testing requirements. Developer computing device 150 may upload the new version of the widget with a command line interface (e.g., command line interface 152). In some instances, command line interface 152 may upload the new version of the widget using a utility provided by computing system 100. Command line interface 152 may use the utility to upload a build artifact that converts a new version of the widget into a standardized format. Command line interface 152 may send the build artifact of the new version of the widget to software repository 170 via network 101. Software repository 170 may store the new version of the widget for the software application (704). Software repository 170 may accordingly store the build artifact of the new version of the widget to help to ensure that all software applications stored on software repository 170 are compatible.

Computing system 100 may generate a configuration file for the new version of the widget for the software application (706). In some instances, management controller 302 may retrieve the configuration information for the new version of the widget. For example, widget monitor 306 of management controller 302 may continuously poll software repository 170 for new versions of the widget. In response to widget monitor 306 detecting software repository 170 has stored the new version of the widget, widget monitor 306 may retrieve the configuration information associated with the new version of the widget. In some examples, configuration file generator 308 may generate a deployment configuration file associated with the software application that includes the new version of the widget. Configuration file generator 308 may generate a deployment configuration file such as configuration file 530 of FIG. 5. Configuration file generator 308 may include configuration information associated with the new version of the widget as part of widget configuration 550. In some examples, the new version of the widget may be specified in dependencies 556 of widget configuration 550.

In the example of FIG. 10, consumer computing device 160 may request access to a software application that implements the widget (708). Consumer computing device 160 may request access to the software application using shell interface 162. Consumer computing device 160 may be a consumer computing device requesting access to the software application to manage electronic documents. Computing system 100 may receive the request to access the software application. Computing system may receive the request to access the software application with API Gateway 220. Computing system 100, or more specifically deployment module 210, may select the request as a recipient of the new version of the widget based on a number of previous requests for the widget (710). In some instances, deployment module 210 may include a preliminary threshold to determine whether the new version of the widget is compatible with the ecosystem provided by computing system 100. Deployment module 210 may determine whether protocols and/or libraries applied in the new version of the widget are consistent with other protocols and/or libraries applied in other widgets managed by computing system 100. For example, computing system 100 may support React 17, but the new version of the widget applies React 18. Deployment module 210 may detect the discrepancy of the version of React applied and issue a warning to developer computing device 150 to alter the new version of the widget to be compatible with the ecosystem supported by computing system 100.

Computing system 100 may send a response to the request that includes the configuration file for the new version of the widget and instructions to execute the software application with the new version of the widget (712). Computing system 100 may generate a response to the request that includes the deployment configuration file (e.g., configuration file 530 of FIG. 5) for the software application that includes the new version of the widget in, for example, widget configuration 550 of FIG. 5. Computing system 100 may also generate a response to the request that includes instructions to execute the software application. Computing system 100 may send the response to consumer computing device 160 using API Gateway 220, for example. Consumer computing device 160 may receive the response with the deployment configuration file and instructions to execute the software application with the new version of the widget (714). Consumer computing device 160 may receive the response with shell interface 162. Consumer computing device 160 may receive the response that includes the configuration information associated with the software application and the new version of the widget.

Consumer computing device 160, or more particularly shell interface 162, may request widgets for the software application based on the deployment configuration file and instructions received from computing system 100 (716). Consumer computing device 160 may send the request to software repository 170 via network 101, for example. Consumer computing device 160 may send a request to fetch widgets based on reference indications (URIs or URLs) included in the deployment configuration file. Software repository 170 may fetch the widgets based on the request sent from consumer computing device 160 (718). Software repository 170 may fetch the widgets for the software application based on the reference indications included in the request sent by consumer computing device 160. Software repository 170 may send consumer computing device 160 the widgets for the software application (720). Software repository 170 may send the widgets to consumer computing device 160 via network 101. Consumer computing device 160 may load the received widgets (722). Consumer computing device 160 may load and execute the received widgets according to the instructions received from computing system 100. In some instances, consumer computing device 160 may send computing system 100 metrics associated with loading widgets for the software application. Consumer computing device 160 may send the runtime execution metrics to computing system 100 via API Gateway 220, for example. Computing system 100 may compare the obtained metrics to criteria defined in metric thresholds 656 of FIG. 9. Computing system 100 may determine whether to continue deployment, roll-back deployment, and/or issue a warning to developer computing device 150 responsive to the comparison of obtained metrics to criteria defined in metric thresholds 656.

Figure 11:
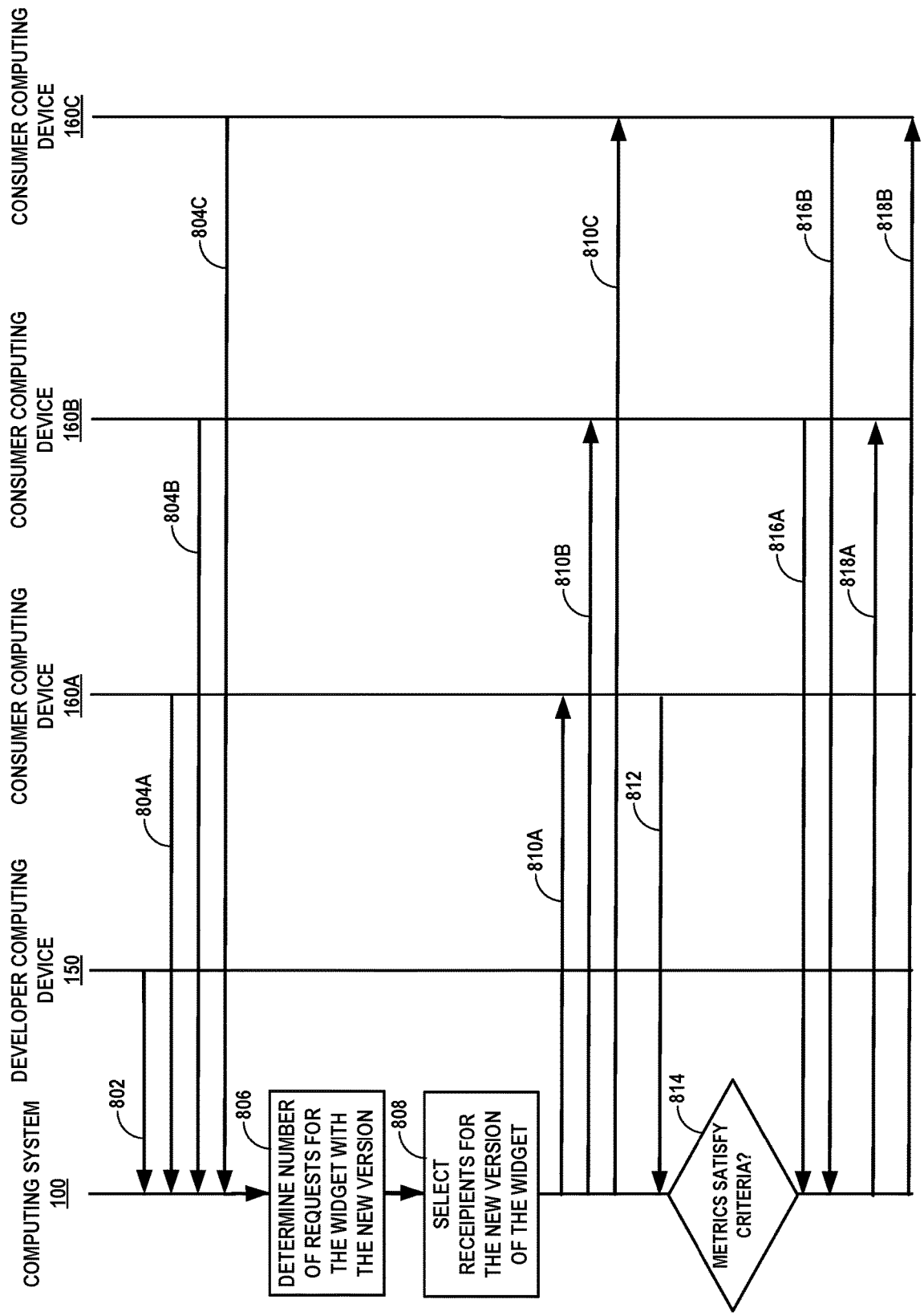
FIG. 11 is a flow chart illustrating an example mode of operation for deploying a new version of a widget, in accordance with the techniques of this disclosure.

FIG. 11 is a flow chart illustrating an example mode of operation for deploying a new version of a widget, in accordance with the techniques of this disclosure. FIG. 10 is discussed with FIGS. 1-9 for example purposes only. In the example of FIG. 11, computing system 100 and developer computing device 150 may correspond to computing system 100 and developer computing device 150 of FIG. 1, respectively. Consumer computing devices 160A-160C may each correspond to consumer computing device 160 of FIG. 1 and/or client devices 160A-160N of FIG. 2.

Once developer computing device 150 uploads a new version of a widget to software repository 170, computing system 100 may instruct developer computing device 150 to input deployment configuration (e.g., deployment configuration 650 of FIG. 9). Developer computing device 150 may send information associated with deployment configuration 650 to computing system 100 (802). At the start time defined in time window 658 of deployment configuration 650, computing system 100 may receive requests 804A-804C for software applications that implement the widget. Request 804A may be sent by consumer computing device 160A, request 804B may be sent by consumer computing device 160B, request 804C may be sent by consumer computing device 160C. Computing system 100 may determine a number of requests for the widget with the new version (806). In the example of FIG. 11, computing system 100 may determine there are three requests for software applications associated with the widget. Computing system 100 may select one or more recipients for the new version of the widget based on the number of requests for the widget and the current time in relation to time window 658. Because computing system 100 received requests 804A-804C at the start time defined in time window 658, computing system 100 may only select consumer computing device 160A as a recipient for the new version of the widget.

Computing system 100 may send consumer computing device 160A instructions to execute the new version of the widget (810A). Computing system 100 may send consumer computing devices 160B and 160C instructions to execute the current version of the widget (810B and 810C). Consumer computing device 160A may send computing system 100 metrics associated with runtime execution of the new version of the widget (812). Consumer computing device 160A may send metrics to computing system 100, such as gate failures, CPU performance, memory performance, GPU performance, battery performance, application launch time, widget load time, number of errors or warnings during runtime execution of the new version of the widget, uncaught bugs, API issues, critical security issues, a particular combination of widget performing poorly, etc. Computing system 100 may determine whether metrics satisfy corresponding criteria (814). Computing system 100 may compare the obtained metrics to corresponding criteria defined in metric thresholds 656 and/or corresponding criteria established by a software administrator associated with computing system 100.

As time approaches the end time defined in time window 658, computing system 100 may receive requests 816A and 816B for software applications that implement the widget associated with the new version. In response to the obtained metrics satisfying corresponding criteria, computing system 100 may send responses 818A and 818B that include instructions to execute the new version of the widget. In response to the obtained metrics not satisfying at least one criterion, computing system 100 may send responses 818A and 818B instructions to execute the current version of the widget. In this way, computing system 100 may avoid performance degradation associated with the new version of the widget affecting more than a few users of consumer computing devices 160.

Figure 12:
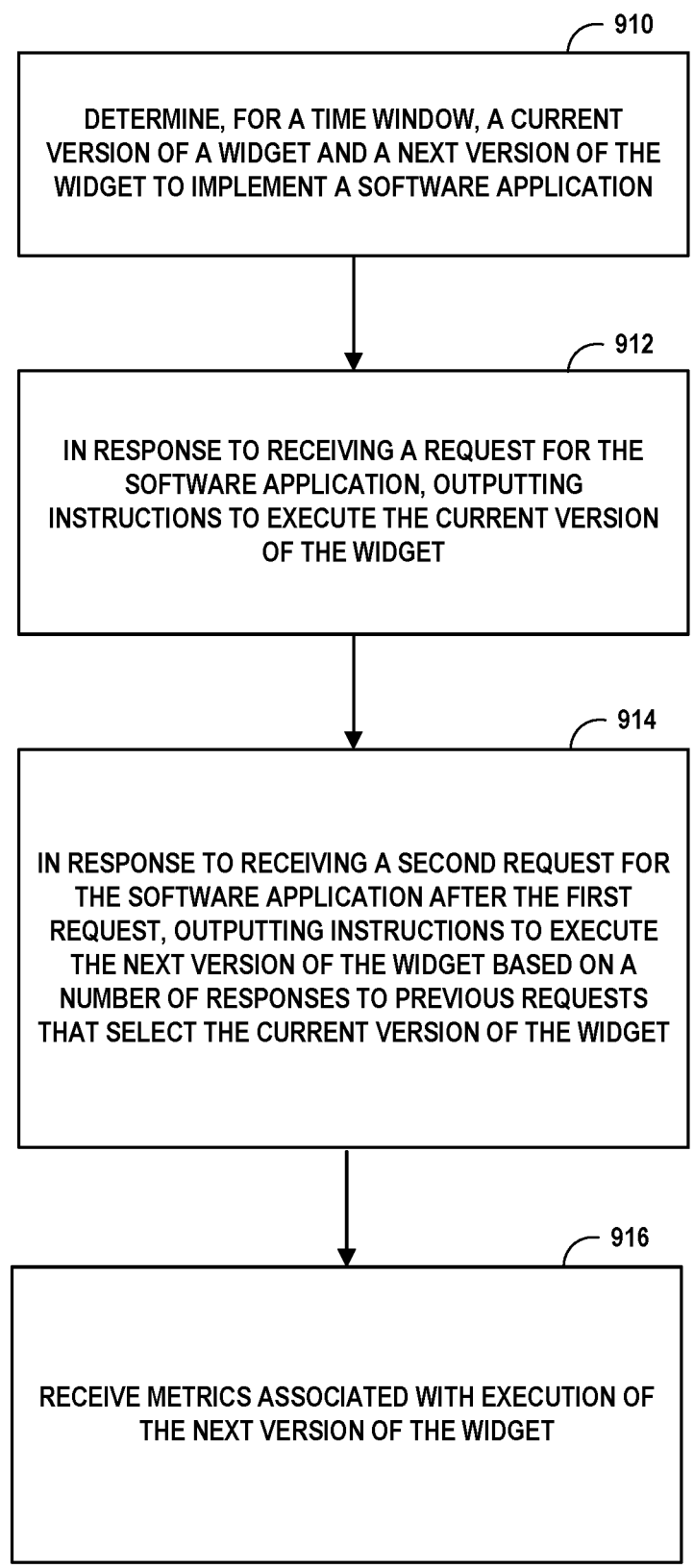
FIG. 12 is a flow chart illustrating an example mode of operation for managing the deployment of a new version of a widget, in accordance with the techniques of this disclosure.

FIG. 12 is a flow chart illustrating an example mode of operation for managing the deployment of a new version of a widget, in accordance with the techniques of this disclosure. FIG. 10 is discussed with FIGS. 1-9 for example purposes only. In the example of FIG. 12, computing system 100 may determine, for a time window, a current version of a widget and a next version of the widget to implement a software application (910). In response to receiving a request for the software application, computing system 100 may output instructions to execute the current version of the widget (912). In response to receiving a second request for the software application after the first request, computing system 100 may output instructions to execute the next version of the widget based on a number of responses to previous requests that select the current version of the widget (914). Computing system 100 may receive metrics associated with execution of the next version of the widget (916).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A system for deploying a software application associated with document management, the system comprising processing circuitry implemented by one or more processors, the processing circuitry having access to a memory and configured to:
   determine, for a time window, a current version of a widget and a next version of the widget to implement a software application of the one or more software applications, wherein a repository is configured to provide the current version of the widget in response to a first call for the current version of the widget and provide the next version of the widget in response to a second call for the next version of the widget;
   in response to receiving a first request for the software application, output instructions to execute the current version of the widget; and
   in response to receiving a second request for the software application after the first request, output instructions to execute the next version of the widget based on a number of responses to previous requests that select the current version of the widget, the previous requests including the first request.

2. The system of claim 1, wherein the first request is sent by a first computing device and the second request is sent by a second computing device, and wherein the processing circuitry is further configured to:

receive, from the second computing device, metrics associated with execution of the next version of the widget.

3. The system of claim 2, wherein the metrics comprise at least one of: a gate failure, hardware performance of the second computing device executing the next version of the widget, a software application launch time, a widget load time, or one or more error logs.

4. The system of claim 2, wherein the processing circuitry is further configured to: in response to receiving a third request for the software application, output the instructions to execute the next version of the widget in response to a determination that the metrics satisfies one or more criteria, wherein the one or more criteria are associated with a state of an environment sending the first request and the second request, wherein the state of the environment comprises an operating system.

5. The system of claim 2, wherein the processing circuitry is further configured to:
determine the metrics associated with execution of the next version of the widget do not satisfy one or more criteria; and
in response to receiving a third request for the software application and the determination that the metrics associated with execution of the next version of the widget do not satisfy the one or more criteria, output instructions to execute the current version of the widget.

6. The system of claim 5, wherein, in response to a determination that the metrics associated with execution of the next version of the widget do not satisfy the one or more criteria, the processing circuitry is further configured to:
output a warning to a developer computing device associated with the next version of the widget.

7. The system of claim 2, wherein, the processing circuitry is further configured to:
determine the metrics associated with execution of the next version of the widget satisfy one or more criteria; and
in response to receiving a third request for the software application from a third computing device and the determination that the metrics associated with execution of the next version of the widget satisfy the one or more criteria, output instructions to execute the next version of the widget based on the number of responses to previous requests that select the current version of the widget and the time window.

8. The system of claim 7, wherein the processing circuitry is further configured to:
in response to receiving a fourth request for the software application from a fourth computing device and a fifth request for the software application from a fifth computing device, output instructions, to the fourth computing device and the fifth computing device, to execute the next version of the widget based on the number of responses to previous requests that select the current version of the widget.

9. The system of claim 2, wherein the processing circuitry is further configured to:
provide the metrics associated with execution of the next version of the widget as an input to a machine learning model, wherein the machine learning model is configured to output runtime characteristics associated with execution of the next version of the widget; and
determine, based on the runtime characteristics, whether to output instructions to execute the current version of the widget or the next version of the widget in response to receiving a subsequent request for the widget.

10. The system of claim 1, wherein the first call and the second call are associated with a demonstration environment or a production environment, wherein the processing circuitry is configured to:
output the instructions to execute the next version of the widget responsive to determining the next version of the widget satisfies at least one preliminary threshold for a respective environment.

11. The system of claim 1, wherein the processing circuitry is further configured to:
refresh the number of previous requests within the time window;
determine a percentage of requests executing the current version of the widget; and
output instructions to execute the next version of the widget based on the percentage of requests executing the current version of the widget.

12. A method for deploying a software application associated with document management comprising:
determining, by a computing system and for a time window, a current version of a widget and a next version of the widget to implement a software application of the one or more software applications, wherein a repository is configured to provide the current version of the widget in response to a first call for the current version of the widget and provide the next version of the widget in response to a second call for the next version of the widget;
in response to receiving a first request for the software application, outputting, by the computing system, instructions to execute the current version of the widget; and
in response to receiving a second request for the software application after the first request, outputting, by the computing system, instructions to execute the next version of the widget based on a number of responses to previous requests that select the current version of the widget, the previous requests including the first request.

13. The method of claim 12, wherein the first request is sent by a first computing device and the second request is sent by a second computing device, and wherein the method further comprises:
receiving, from the second computing device, metrics associated with execution of the next version of the widget.

14. The method of claim 13, wherein the metrics comprise at least one of: a gate failure, hardware performance of the second computing device executing the next version of the widget, a software application launch time, a widget load time, or one or more error logs.

15. The method of claim 13, further comprising:
in response to receiving a third request for the software application, outputting instructions to execute the next version of the widget in response to a determination that the metrics satisfies one or more criteria, wherein the one or more criteria are associated with a state of an environment sending the first request and the second request, wherein the state of the environment comprises an operating system.

16. The method of claim 12, wherein the first call and the second call are associated with a demonstration environment or a production environment, and wherein outputting the instructions to execute the next version of the widget comprises:
outputting the instructions to execute the next version of the widget responsive to determining the next version of the widget satisfies at least one preliminary threshold for a respective environment.

17. The method of claim 12, further comprising:
refreshing the number of previous requests within the time window;
    determining a percentage of requests executing the current version of the widget; and
    outputting instructions to execute the next version of the widget based on the percentage of requests executing the current version of the widget.

18. Computer-readable storage media comprising instructions that, when executed, configure processing circuitry of a computing system to:
    determine, for a time window, a current version of a widget and a next version of the widget to implement a software application of the one or more software applications, wherein a repository is configured to provide the current version of the widget in response to a first call for the current version of the widget and provide the next version of the widget in response to a second call for the next version of the widget;
    in response to receiving a first request for the software application, output instructions to execute the current version of the widget; and
    in response to receiving a second request for the software application after the first request, output instructions to execute the next version of the widget based on a number of responses to previous requests that select the current version of the widget, the previous requests including the first request.

19. The computer-readable storage media of claim 18, wherein the first request is sent by a first computing device and the second request is sent by a second computing device, and wherein the processing circuitry is further configured to:
    receive, from the second computing device, metrics associated with execution of the next version of the widget.

20. The computer-readable storage media of claim 18, wherein the processing circuitry is further configured to:
    refresh the number of previous requests within the time window;
    determine a percentage of requests executing the current version of the widget; and
    output instructions to execute the next version of the widget based on the percentage of requests executing the current version of the widget.

\* \* \* \* \*